(12) United States Patent
Bergstrom et al.

(10) Patent No.: US 12,544,689 B2
(45) Date of Patent: Feb. 10, 2026

(54) ELECTRIC JACKET SYSTEM AND METHODS

(71) Applicant: Gene Pool Technologies, Inc., Cherry Hills Village, CO (US)

(72) Inventors: Sam Bergstrom, Merritt Island, FL (US); Stephen Martin, Cherry Hills Village, CO (US)

(73) Assignee: Gene Pool Technologies, Inc., Hamden, CT (US)

( * ) Notice: Subject to any disclaimer, the term of this patent is extended or adjusted under 35 U.S.C. 154(b) by 687 days.

(21) Appl. No.: 17/759,680

(22) PCT Filed: Jan. 22, 2021

(86) PCT No.: PCT/US2021/070061
§ 371 (c)(1),
(2) Date: Jul. 28, 2022

(87) PCT Pub. No.: WO2021/155393
PCT Pub. Date: Aug. 5, 2021

(65) Prior Publication Data
US 2023/0107082 A1 Apr. 6, 2023

Related U.S. Application Data

(60) Provisional application No. 62/968,350, filed on Jan. 31, 2020.

(51) Int. Cl.
*A61L 2/00* (2006.01)
*B01D 11/02* (2006.01)
*F25B 21/02* (2006.01)

(52) U.S. Cl.
CPC ...... *B01D 11/0207* (2013.01); *B01D 11/0211* (2013.01); *B01D 11/0219* (2013.01); *F25B 21/02* (2013.01)

(58) Field of Classification Search
CPC ... B01D 11/0219; B01D 11/0207; C11B 1/10; C11B 9/02; A61K 36/185
USPC .......................................... 422/261, 285, 292
See application file for complete search history.

(56) References Cited

FOREIGN PATENT DOCUMENTS

WO    WO-2018215520 A1 * 11/2018    ............... C11B 9/02

\* cited by examiner

*Primary Examiner* — Monzer R Chorbaji
(74) *Attorney, Agent, or Firm* — Daniel C. Pierron; Widerman Malek, PL

(57) ABSTRACT

Electric jacket systems and methods for extraction are described. A system may be arranged or arrangeable for electrically controlling a temperature of one or more extraction system components. The system may include a first plurality of thermoelectric devices, the first plurality arranged or arrangeable for coupling with a first extraction system component at multiple locations along the first extraction system component. The system may further include a controller operably coupled to the first plurality of thermoelectric devices, with the controller configured or configurable to establish or maintain at least a first target temperature by selectively applying or causing the selective application of electrical power to the first plurality of thermoelectric devices.

30 Claims, 30 Drawing Sheets

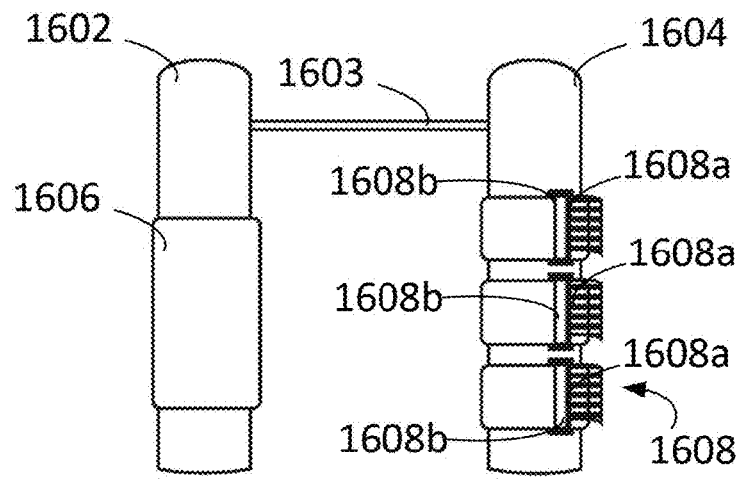
FIG. 16  Prior Art
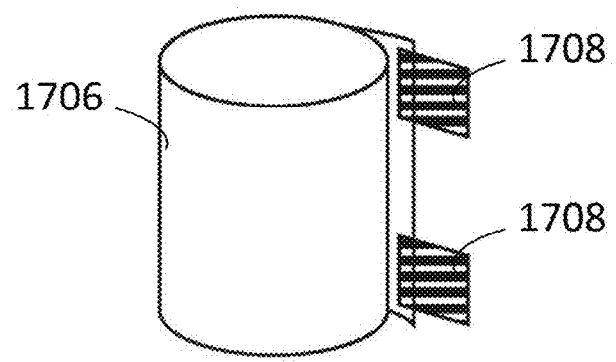
FIG. 17A  Prior Art
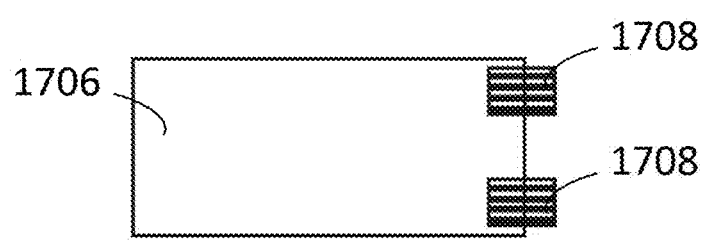
Prior Art  FIG. 17B

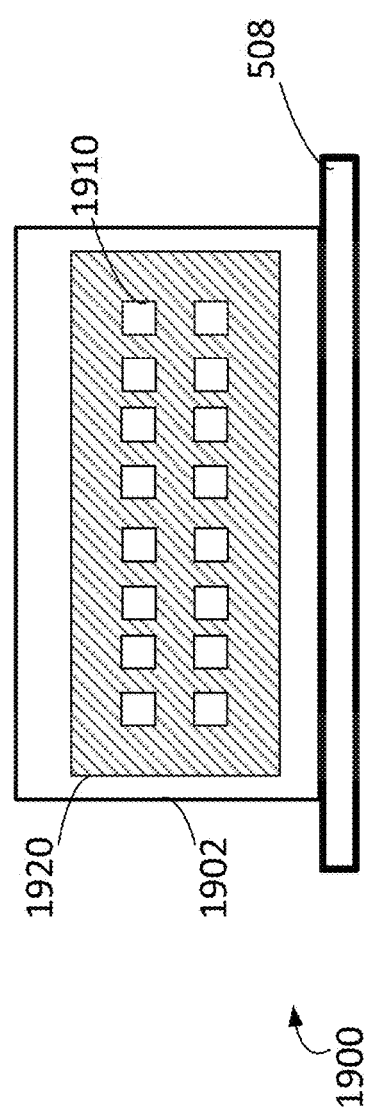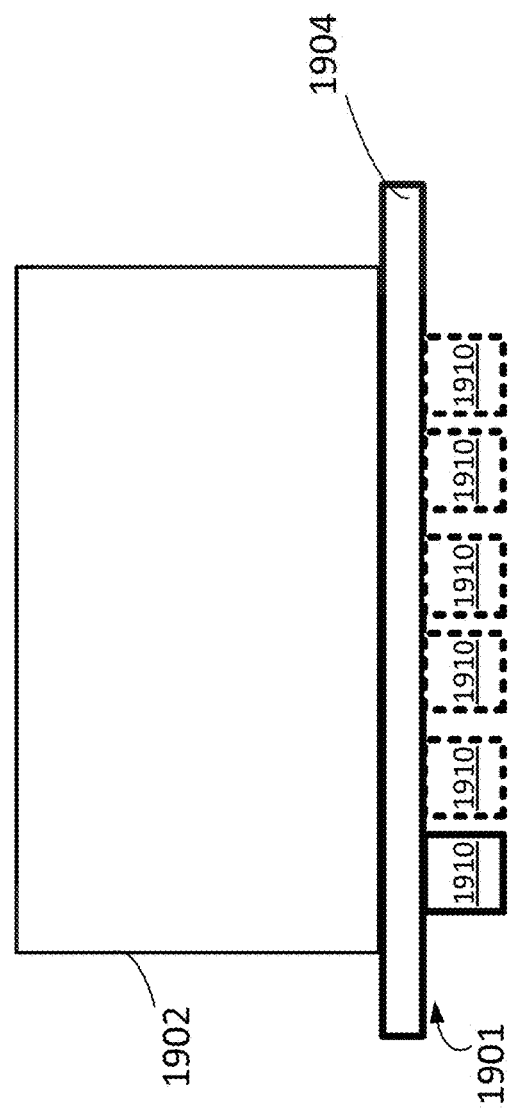

ELECTRIC JACKET SYSTEM AND METHODS

BACKGROUND

The present disclosure relates generally to systems for extracting solute from source materials, such as extracting terpenoids (e.g., cannabinoids and terpenes), flavonoids, and/or other components from (1) cannabis, hemp, and/or derivatives thereof (e.g., hash, sift, kief, and rosin, among other examples) and (2) other botanical substances such as terpene-bearing plants and/or fruits and/or extracting psilocybin, psilocin, baeocystin, and/or norbaeocystin from Psilocybe mushrooms and/or derivatives thereof. In general, systems configured to extract components from component-bearing and/or unctuous materials (e.g., source materials, such as plant/botanical material and derivatives thereof and/or animal-derived materials) are described.

Known extraction systems typically heat or cool extraction system components (e.g., solvent tanks, collection tanks, separation tanks, extraction columns/canisters, condensers, separators, and other vessels) with jackets in fluid communication with a water heater and/or water cooler to circulate warm or cold water and thereby heat or cool the extraction system component that the jacket is thermally coupled with. A jacket may be removable from or integral with an extraction system component. Water jackets that selectively cool and heat extraction system components are described in US Patent Publication No. 20170326472.

Extraction system components may alternatively be heated with thermally coupled resistive heaters (i.e., Joule heating) such as thermal pads that thermally couple with the bottom of an extraction system component or may be wrapped around an extraction vessel, as described in U.S. Pat. No. 9,682,333.

WO2018215520 discloses arranging a thermoelectric device (e.g., a Peltier device) onto a single location of an extraction vessel of a small, "tabletop" extractor that is designed for consumer, low-throughput use. The current "direction" that is applied to the thermoelectric device may be reversed to heat or cool the extraction vessel.

WO2018098410 discloses a portable extraction device with a Peltier element arranged between an evaporator and the condenser. The hot side of said Peltier is fixed to one side, attached to the evaporator, and used for heating the extraction fluid in the evaporator and transforming it from a liquid state to a gas state. The cold side is naturally also fixed, attached to the condenser, and is used for cooling the extraction fluid in the condenser and transforming it from a gas state to a liquid state.

The above systems may be improved upon and examples of new and useful extraction systems and methods that are relevant to the needs in the field are discussed below.

SUMMARY

The present disclosure is directed to the appended claims and accompanying description including combinations and sub-combinations thereof.

BRIEF DESCRIPTION OF THE DRAWINGS

FIGS. 14-18 are schematic views of example electric jackets;

FIGS. 19A, 19B, and 20 are schematic views of example separator vessel systems;

DETAILED DESCRIPTION

Figure 1:
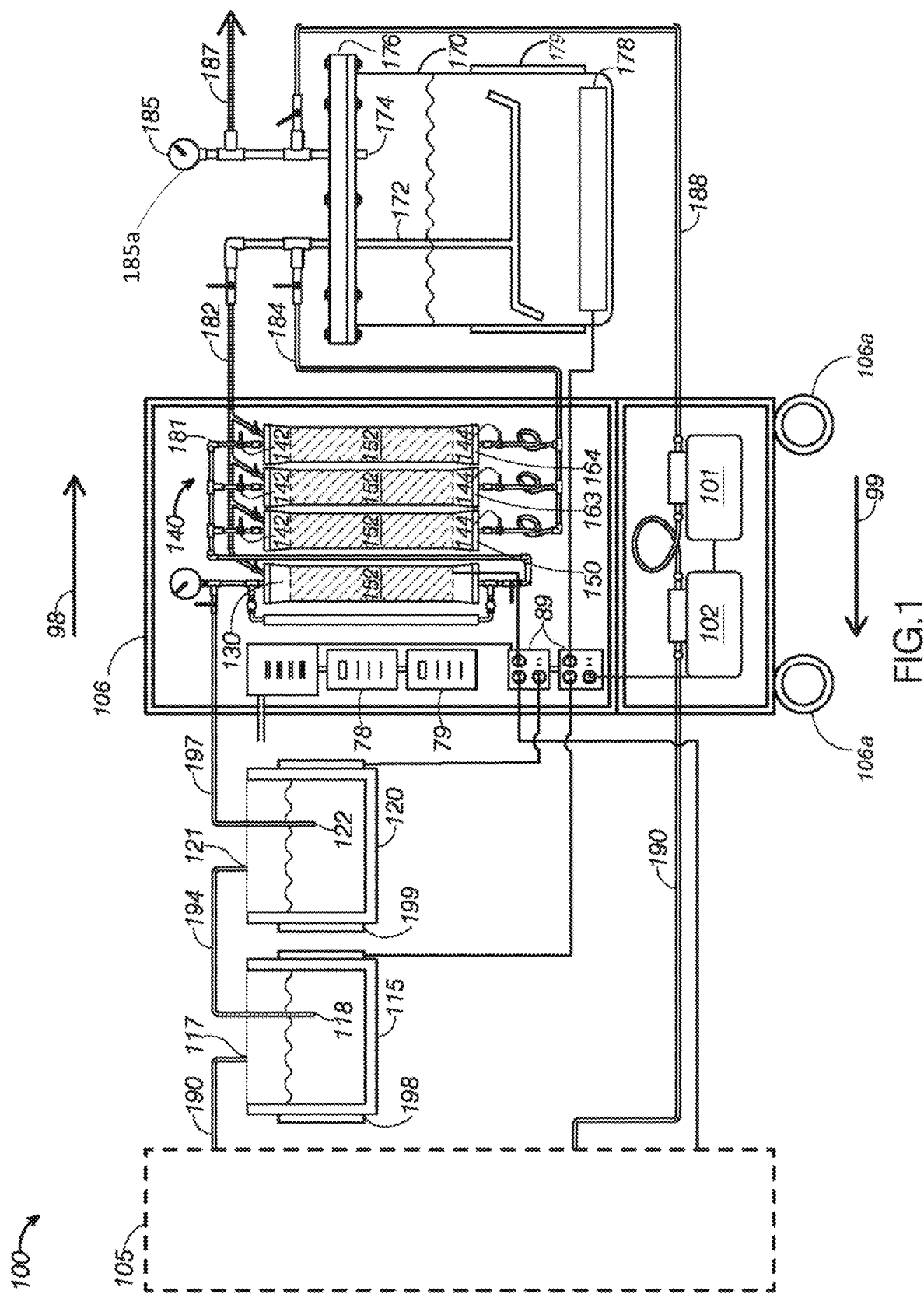
FIG. 1 is a diagrammatic view of a first example system for extracting solute from a source material.

The disclosed systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation may not be individually described in the following detailed description.

Throughout the following detailed description, examples of various systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

As used herein, "electric thermal elements" include heating elements (e.g., resistive heating elements) and/or cooling elements (e.g., thermoelectric devices, which may cool, heat, or can alternate between heating and cooling an extraction system component). "Thermoelectric devices" typically comprise a plurality of thermoelectric elements (e.g., semiconductor elements) sandwiched between two substrate elements (e.g., a dielectric material). Said substrate elements may, indirectly or directly, mechanically and/or thermally couple the plurality of thermoelectric elements with a heatsink or an object to be thermally regulated.

"Cooling element" may be a thermoelectric device arranged to at least cool an extraction system component. In thermoelectric embodiments, such cooling elements may also be heating elements in systems that change the current direction (e.g., changing the applied voltage polarity) flowing through a thermoelectric device for alternating the "hot" and "cold" side of a thermoelectric device (i.e., thermally active sides). "Thermal sensors" and "temperature sensors" are used interchangeably.

Unless otherwise noted, a dotted line that connect two or more extraction system components in the figures generally signifies one or more fluid communication paths between or among said two or more extraction system components. Fluid lines, pumps, valves, and/or further extraction system components may be arranged along said fluid communication path and may be omitted in the figures for sake of clarity and highlighting inventive aspects. Extraction system components in "fluid communication" means that a fluid can at least flow from one extraction system component to the other. Extraction system components can still be in fluid communication even with intervening pumps, valves, and/or further extraction system components (e.g., a separator). "Selective fluid communication" means that a fluid connection may be selectively established via, for example, a fluid connector (e.g., valves, manifolds, and the like).

Figure 15:
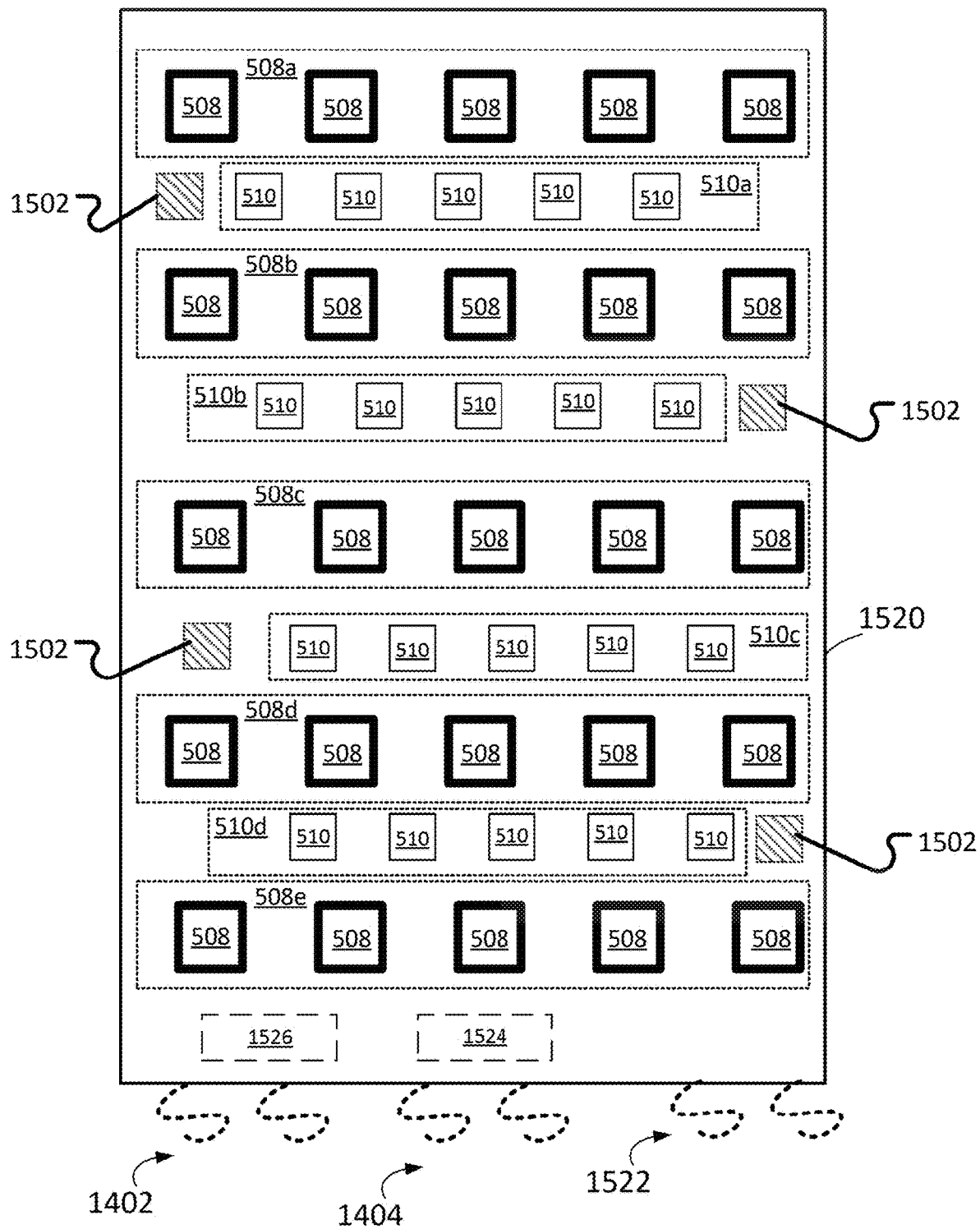
Figure 20:
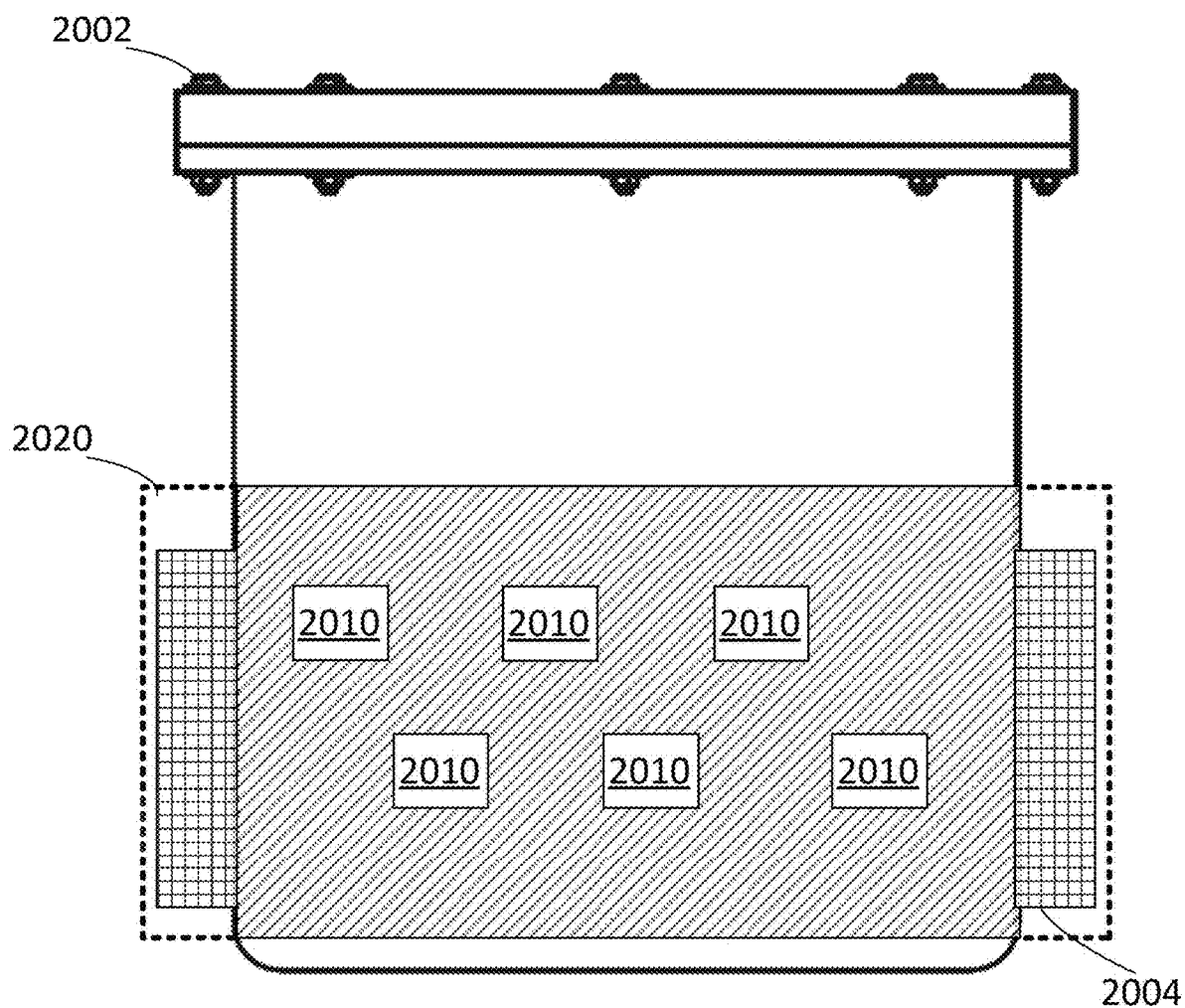

Objects (e.g., extraction system components and elements thereof) depicted in the figures with a dotted boundary generally denote that said objects are optional in at least some embodiments. However, some objects are partially or fully depicted by a dotted boundary in the figures, where the dotted line depicts an object (portion) that is obscured by and/or arranged within another object (e.g., probe 1330 of FIG. 13C, vessel 502 of FIG. 13D, and elements 2106a and 2106b). In FIG. 20, the dotted sections of jacket 2020 denote a cut-away section, to show jacket 2004 (i.e., showing a portion of jacket 2004 that is surrounded by jacket 2020). In FIG. 15, subgroupings 508a-e and 510a-d are denoted by a dotted box surrounding the respective sub-grouped thermal elements, heating element 508 and cooling element 510.

Figure 2:
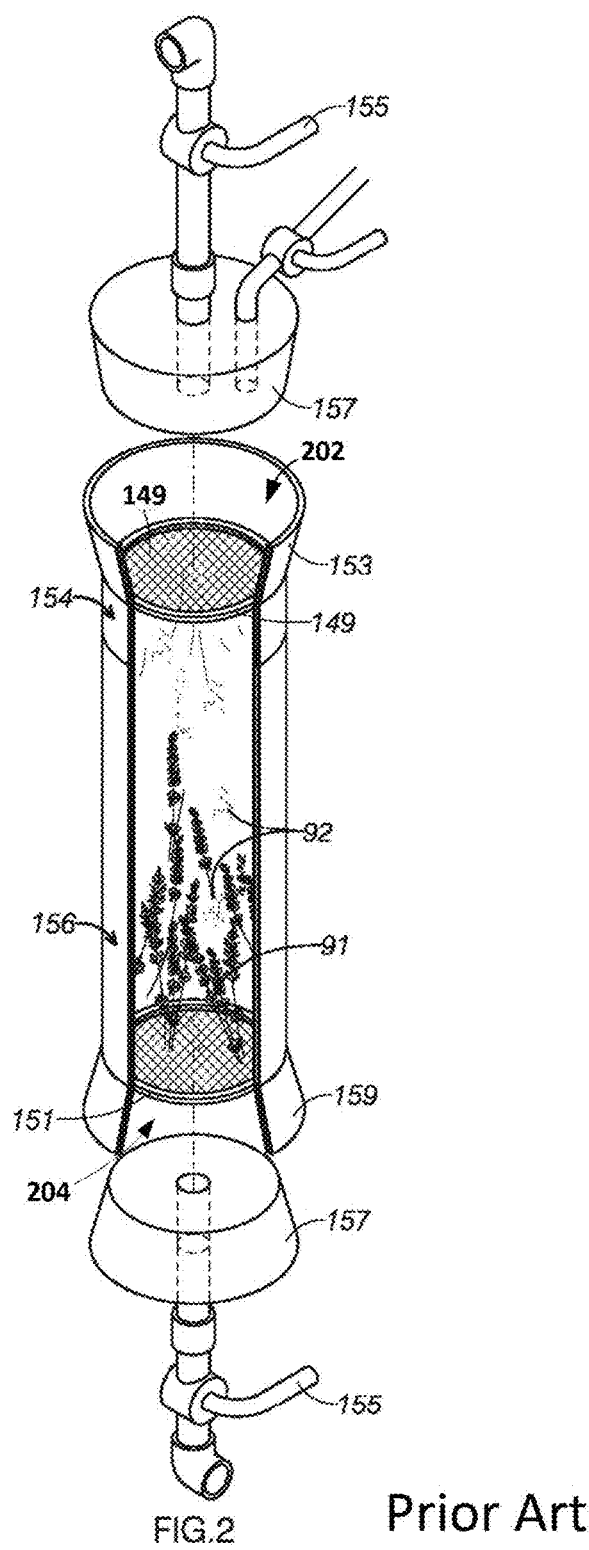
FIG. 2 is a perspective cutaway view of an example of a known detachable canister.

With reference to FIGS. 1 and 2, a first example of a system for extracting solute from a source material, system 100, will now be described. As FIG. 1 shows, system 100 includes a solvent source container 120, a solvent conditioner 130, an extraction vessel system 140, an extract container 170, a first pump 101, a second pump 102, a condenser 105, and a solvent collection container 115. System 100 additionally includes various valves and fluid lines (defining pipes) that control the flow of fluids through system 100 during operation.

System 100 may be adapted for using, among other solvents, carbon dioxide ($CO_2$), a hydrocarbon or blend thereof (e.g., propane, n-butane, and/or isobutane), and/or ethanol to extract components from plant material such as hemp, cannabis, or mushrooms. FIG. 2 depicts an embodiment of system 100 that uses a hydrocarbon or hydrocarbon blend to extract essential oils from lavender plants. FIG. 2 illustrates lavender 91 contained within first detachable canister 150, being exposed to a solvent, liquid hydrocarbon 92, within a canister of system 100.

Figure 3:
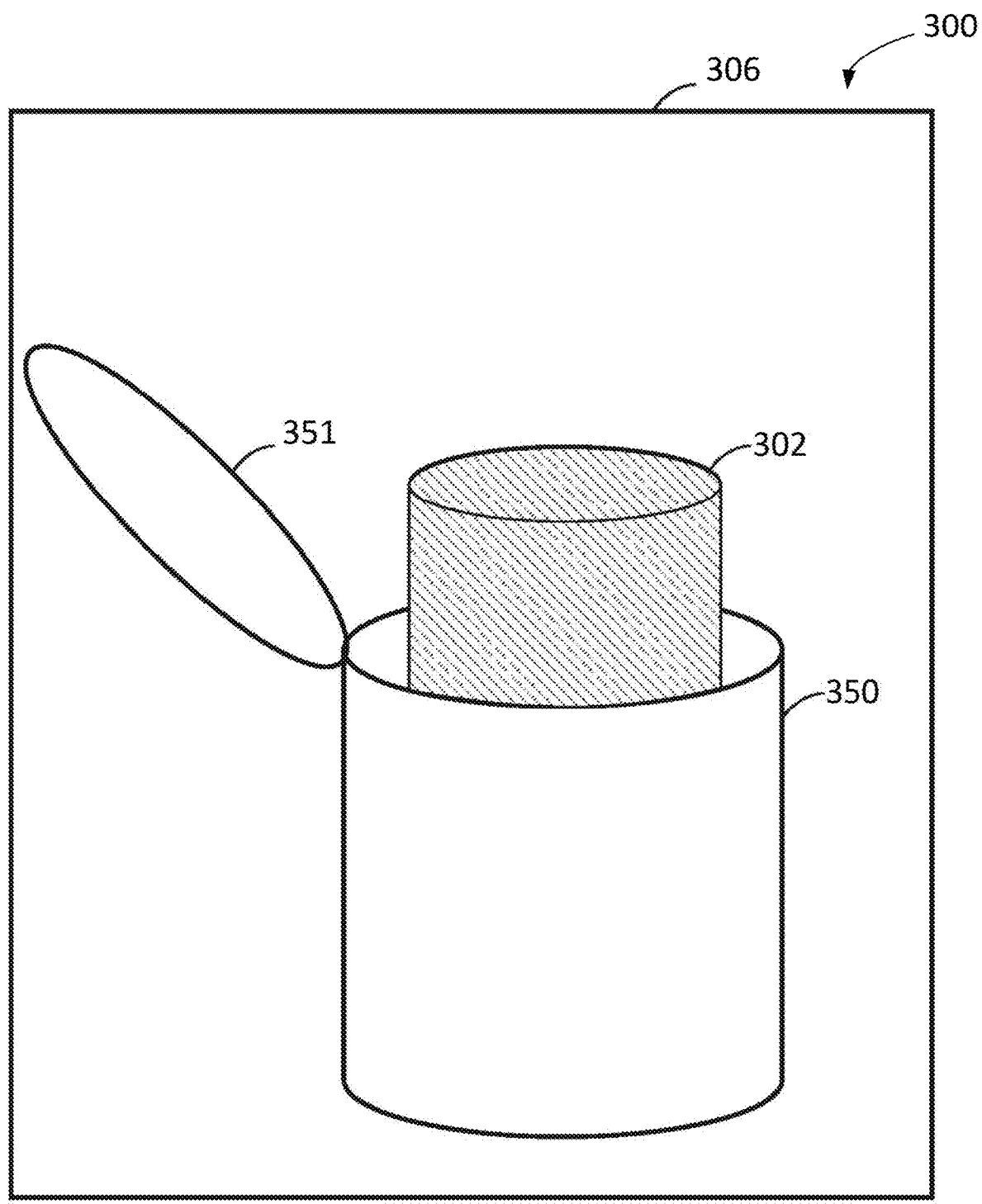
FIG. 3 is a schematic view of an example of a known extraction vessel system.

Support structure 106 may mechanically, electrically, and/or fluidly interface with detachable canisters 150, 163, and 164, which are a type of extraction vessel, but extraction vessels may be, alternatively, welded or mechanically coupled to support structure 106 such that the extraction vessels cannot be removed from support structure 106 without considerable effort and/or tools. Regardless of using a detachable or "fixed" extraction vessel, an operator may place (and remove) a mesh containing plant material within an extraction vessel for extraction. The mesh may define a rigid, cylinder-like shape that is dimensioned to slide in and out of an extraction vessel, as shown in FIG. 3. The mesh may also define a flexible bag that holds the plant material during placement and extraction within an extraction vessel.

Support structure 106 examples include frameworks, carts, skids, and modular units or a combination thereof. Support structure 106 may be moved via a plurality of wheels 106a, typically seen with framework, cart, and modular-unit embodiments. Support structure 106 may alternatively be mechanically coupled to a floor with, for example, bolts.

As FIG. 2 shows, first detachable canister 150 may contain lavender 91 and liquid hydrocarbon 92 to extract the essential oils from the source material in an extract solution, containing a hydrocarbon and lavender essential oil. After a period of time for effectively extracting essential oil from lavender plant materials, the extract solution is removed from first detachable canister 150.

The extract solution is directed to an extract container. The extract container may be arranged to heat the contained extract solution above the boiling point of the solvent to separate substantially purified post-extraction solvent from the extract solution. The evaporated post-extraction solvent may then be transported for later use. After removing the post-extraction solvent from the extract container, the residual material in the extract container defines a distilled, high-purity essential oil of the source material.

Extract container 170 is connected in fluid communication with solvent collection container 115. "Fluid communication" includes both direct and indirect connections that allow fluid to flow between or among extraction system components. Said fluid may be a liquid, gas, or a combination thereof as it flows from one extraction system component to another. Since solvent can flow from solvent source container 120 to extract container 170, both extraction system components are in fluid communication, along with intermediary extraction system components, solvent conditioner 130 and extraction vessel system 140.

Extract container 170 is arranged to separate the solvent from the extracted solute, allowing system 100 to direct and collect the used solvent in solvent collection container 115. Other systems may omit container 115 and direct the reclaimed solvent directly to container 120.

Solvent source container 120 is connected in fluid communication with solvent conditioner 130 and in fluid communication with solvent collection container 115. As FIG. 1 illustrates, solvent source container 120 includes a source container input 121 and a source container output 122. Source container input 121 is arranged to fluidly receive solvent communicated from solvent collection container 115. For example, first pump 101 and second pump 102 may pump solvent contained in solvent collection container 115 as system 100 proceeds through an extraction cycle. Source container input 121 may be configured to restrict the passage of fluid back into solvent collection container 115.

Source container output 122 is arranged to direct solvent contained in solvent source container 120 to solvent conditioner 130 via a solvent source line 197. By directing fluid to solvent conditioner 130, solvent source container 120 introduces the solvent in the current cycle of system 100's extraction process. In some examples, solvent source line 197 may include an internal filter. The internal filter may be used to remove impurities in solvent prior to introducing the solvent to extraction vessel system 140. An internal filter may be arranged at other or additional points of system 100.

Because solvent source container 120 is configured to fluidly receive solvent from solvent collection container 115, solvent source container 120 may be refilled with post-extraction solvent collected by solvent collection container 115 during previous extraction cycles performed by system 100. By directly reintroducing post-extraction solvent to solvent source container 120, system 100 is able to reclaim post-extraction solvent at a high rate. Further, the reclaimed solvent may be of a higher purity than fresh, commercially sourced butane. Butane often ships with an odorant, such as mercaptan or thiophane. When using a solvent containing such an odorant, the extracted essential oil may include portions of the odorant. This results in a less desirable end product.

In some examples, solvent source line 197 may include a solvent filter within its fluid-transmissive interior, thereby passing solvent through the filter as it passes from solvent source container 120 to solvent conditioner 130. In some examples, the solvent filter may define a 13-X molecular sieve configured for membrane filtration of the solvent as it passes from solvent source container 120 to solvent conditioner 130.

As FIG. 1 shows, solvent conditioner 130 is in fluid communication with solvent source container 120. solvent conditioner 130 may be in fluid communication with first pump 101 and second pump 102, assuming appropriate valves are open. Solvent conditioner 130 is arranged to receive solvent from solvent source container 120.

Solvent conditioner 130 may be configured to compress, or "charge," the received solvent. In compressor examples, the compressor may be electrically powered, such as by plugging into an electrical outlet 89. In other examples, solvent conditioner 130 may pressurize solvent using backflow pressure produced by first pump 101 and second pump 102.

In some examples, it is desirable to use a high temperature, liquid solvent for extraction. Solvent conditioner 130 may be used to compress solvent to an extraction pressure, the extraction pressure selected to maintain solvent in a liquid state even when exposed to an elevated extraction temperature. After pressurizing the solvent, solvent conditioner 130 is configured to introduce the pressurized solvent into extraction vessel system 140.

Solvent conditioner 130 may change or maintain a solvent characteristic such temperature and/or operating pressure. As discussed in detail below, solvent conditioner 130 may be thermally coupled to an electric jacket 152 for thermally regulating a received solvent. For live resins and similar "cold" extract methodologies, solvent conditioner 130 may maintain at, or further cool the received solvent to, below room temperature and typically below 0° C. For $CO_2$ solvent applications, solvent conditioner 130 may be used to maintain or establish a temperature above room temperature to maintain a sub or supercritical state of the $CO_2$ solvent before being introduced into an extraction vessel.

As FIG. 1 shows, extraction vessel system 140 is connected in fluid communication with solvent conditioner 130. As FIG. 1 illustrates, extraction vessel system 140 may include a plurality of detachable canisters, including a first detachable canister 150, a second detachable canister 163, and a third detachable canister 164. Systems with a single extraction vessel are also possible embodiments. Extraction vessel system 140 may be configured to direct solvent from solvent conditioner 130 to each detachable canister via a detachable canister line 181.

Extraction vessel system 140 is configured to fluidly receive solvent that is conditioned by solvent conditioner 130. Extraction vessel system 140 is further configured to direct to extract container 170 extract solution produced within attached canisters, the extract solution including both solvent and solute extracted from source materials contained in the canisters. Extraction vessel system 140 may be further configured to direct to extract container 170 any overflow solvent output by solvent conditioner 130 and not received by a detachable canister.

As FIG. 1 illustrates, extraction vessel system 140 is configured to direct fluid from solvent conditioner 130 to each detachable canister. As FIG. 1 shows, extraction vessel system 140 includes an input valve associated with each detachable canister. Each input valve controls fluid communication between solvent conditioner 130 and the associated detachable canister. When an input valve is opened, solvent conditioner 130 is configured to communicate conditioned solvent to the associated canister.

As FIG. 1 shows, solvent conditioner 130 is arranged to communicate with each detachable canister individually. Accordingly, extraction vessel system 140 allows an operator to refill a selected canister as one or more of the other canisters remain closed and to continue extracting solute from contained source material. A cannister or other extraction vessel may be refilled directly with botanical material or said material contained by a meshed container, with the meshed container being inserted into the extraction vessel, as shown in FIG. 3.

As FIG. 1 shows, extraction vessel system 140 is configured to direct the extract solution created in each detachable canister to extract container 170 via an extract mixture line 184. As FIG. 1 shows, extraction vessel system 140 includes an output valve associated with each detachable canister. When an output valve is opened, the associated canister is placed in fluid communication with extract mixture line 184.

When placed in fluid communication, the associated canister is configured to output an extract mixture to extract container 170 via extract mixture line 184. A user may use the output valves to direct the extract mixture contained in an associated canister to extract container 170. In some examples, first pump 101 and second pump 102 are configured to cooperatively suck the extract mixture from the associated canister toward extract container 170.

As FIG. 1 illustrates, extraction vessel system 140 additionally includes an overflow line 182 in fluid communication with solvent conditioner 130, each detachable canister, and extract container 170. Overflow line 182 is configured to direct overflow solvent that does not make it from solvent conditioner 130 to one of the detachable containers after charging. For example, overflow line 182 may be used to collect solvent trapped in detachable canister line 181 after filling one of the detachable canisters with solvent.

FIG. 2 illustrates an example detachable canister, first detachable canister 150, filled with solvent and source material. In FIG. 2, first detachable canister 150 is currently extracting solute from the source material. As FIG. 2 illustrates, first detachable canister 150 includes a top portion 154, which may mechanically couple with bottom portion 156. When top portion 154 and bottom portion 156 are attached, in such embodiments, they define a fluid-tight container configured to store solvent and source material during extraction. In alternative embodiments, top portion 154 and bottom portion 156 may integrally define canister 150.

As FIG. 2 shows, first detachable canister 150 may additionally or alternatively include a top mesh filter 149 and a bottom mesh filter 151. As FIG. 2 shows, top mesh filter 149 defines a perimetral gasket surrounding a mesh filter. The perimetral gasket is made of a food-grade nitrile, allowing first detachable canister 150 to be legally used to extract solute that may be used for food products. As FIG. 2 illustrates, top mesh filter 149 is configured to be slidingly inserted into the top of first detachable canister 150 to prevent sediment from inadvertently backflowing through the input of first detachable canister 150. The perimetral gasket is sized to partially compress within first detachable canister 150, thus frictionally supporting top mesh filter 149 in a substantially fixed position within first detachable canister 150.

In some examples, the filter of top filter 149 may define a stainless steel 200 mesh filter. In some examples, the gasket portion of top filter 149 may define food grade nitrile.

Bottom mesh filter 151 is substantially similar to top mesh filter 149, but is positioned proximate the bottom of first detachable canister 150. Accordingly, bottom mesh filter 151 is configured to prevent sediment from inadvertently flowing through the output of first detachable canister 150. Canister 150, like most extraction vessels, defines or otherwise comprises solvent input 202, typically an orifice arranged and dimensioned to receive solvent, and mixture output 2024, typically an orifice arranged and dimensions to provide a solvent-solute mixture (e.g., an extract mixture) such as, in some examples, a solution (i.e., a homogeneous mixture).

Because system 100 may include multiple canisters and each canister is removable, system 100 is able to extract solute in the connected, filled containers as other functions of system 100 continue to operate. For example, when one canister is attached and extracting, solvent conditioner 130 may charge solvent for a second canister. Further, a user may be able to load a detached canister as solvent conditioner 130 charges solvent, providing even greater parallelism.

Even in the case that system 100 includes fixed extraction vessels, the same parallelism may be achieved with moving meshed containers in and out of the fixed extraction vessels, as shown in FIG. 3.

As FIG. 2 shows, extraction vessel system 140 may include, for each detachable canister, both an upper canister attachment device 153 and a lower canister attachment device 159. Each upper canister attachment device 153 and lower canister attachment device 159 may be arranged to selectively secure the associated detachable canister. As shown in FIG. 2, each upper canister attachment device 153 device includes a handle 155, which defines an over-center securing lever configured to be pulled to lock upper canister attachment device 153 in a substantially fixed position over the top opening of the associated canister. As FIG. 2 shows, each upper canister attachment device additionally defines a compressible, fluid tight gasket 157 configured to be compressed against the associated canister when upper canister attachment device 153 is locked in a closed configuration. As FIG. 2 shows, upper canister attachment device 153 may be pulled away and spaced from the associated canister when handle 155 being released.

System 140 may include just an upper or lower extraction vessel attachment device. Said attachment devices may operate "tool-lessly", such that an operator's hands can use, for example, a handle to couple the attachment device and an extraction vessel, as shown in FIG. 4. As shown in FIG. 3, the attachment device may be a lid that seals the extraction vessel, particularly if the extraction vessel is not easily detachable.

As FIG. 2 shows, lower canister attachment device 159 is configured to slidingly receive the lower opening of an associated canister. As FIG. 2 illustrates, lower canister attachment device 159 includes a compressible, fluid tight gasket 157. As FIG. 2 illustrates, a user may manipulate upper canister attachment device 153 to receive the associated canister such that the canister is engaged with both gaskets 157. When a user pulls handle 155 to position upper canister attachment device 153 in a locked configuration, both gaskets 157 are configured to compress to place the canister in fluid communication with both solvent conditioner 130 and extract container 170. Similarly, both gaskets are configured to release when handle 155 is released. When handle 155 is released and upper canister attachment device 153 is pulled away from the associated canister, the canister can be slidingly removed from lower canister attachment device 159 to be removed from system 100.

As FIG. 1 illustrates, each detachable canister includes an electric jacket 152 wrapped around its exterior. Each electric jacket 152 is configured to receive electrical energy, such as by being plugged into electrical outlet 89, to heat the canister that it is coupled to. Increasing the temperature can, in many cases, increase solvents' efficacy and efficiency in extracting solute from a source material. The jackets may be controlled by an electronic jacket controller 78, which generally controls an electric jacket to operate at a chosen "target" temperature.

An electric jacket may heat, cool, or a combination thereof, as described in more detail below. In some embodiments, system 100 can omit pumps, solvent conditioners, and/or condensers by having electric jackets heat or cool, as need. Electric jackets 198 and 199 may cool to condense solvent and heat for creating a head pressure. Electric jackets 152 can establish or maintain an extraction temperature. Afterwards, electric jackets 152 may heat extraction vessels to capture residual solvent in the botanical material. Electric jacket(s) 199, 152, and/or 179 may cool to create a temperature differential between an extraction vessel or extraction container and a solvent source.

As FIG. 1 shows, extract container 170 is in fluid communication with extraction vessel system 140 and arranged to receive extract solution output by the detachable canisters and any overflow solvent transmitted by overflow line 182. extract container 170 includes a container input 172, a container output 174, and a lid 176. Extract container 170 is arranged to receive the extract mixture (i.e., a solute-solvent mixture) output by the detachable canisters. Extract container 170 is further arranged to separate post-extraction solvent from the extract mixture and output the post-extraction solvent for reclamation.

Container input 172 is configured to receive extract mixture in a liquid state from the detachable canisters. As FIG. 1 illustrates, an extract container heating element 178 is thermally coupled with the contents of extract container 170, being positioned at the bottom of extract container 170. Heating element 178 may be electrically powered heating pad rated at 500 Watts. The heating pad may be operated to heat the extract mixture to a distilling temperature to produce an evaporated portion of the solvent in extract container 170. The distilling temperature to which extract container 170 is heated is greater than the boiling point of butane and less than typical essential oil boiling points.

Heating element 178 may be powered by an electrical connection to electrical outlet 89. Additionally, the temperature or intensity of heating element 178 may be controlled by an electronic container heating element controller 79.

If electric jacket 179 is adapted to heat and cool, heating element 178 may not be needed or may be used in conjunction with electric jacket 179 (e.g., both element 178 and jacket 179 heating container 170). Heating element may be an induction stove for heating extract container 170.

As FIG. 1 illustrates, system 100 includes a pressure release valve 185 and pressure release line 187, both in fluid communication with container output 174. Pressure release line 187 is in fluid communication with ambient air at a location in which it is safe to output flammable fluids. During operation, the pressure of the interior of extract container 170 may fall outside the bounds of desirable operating pressures. For example, pressure release valve 185 may be configured to open pressure release line 187 upon extract container 170 exceeding 150 pounds per square inch of positive pressure or negative 30 pounds per square inch of vacuum pressure. Pressure release valve 185 includes pressure sensor 185, which may reside on or in and/or fluidly connected to other extraction system components. In some embodiments, pressure sensors may reside inside a vessel.

As FIG. 1 illustrates, first pump 101 and second pump 102 are connected in fluid communication with extract container 170. First pump 101 and second pump 102 are configured to direct fluid through system 100 in the direction indicated by arrows 98 and 99 shown in FIG. 1. For example, first pump 101 and second pump 102 are configured to cooperate to direct evaporated post-extraction solvent from extract container 170 to solvent collection container 115 over a container output line 188 and a solvent collection line 190. In some examples, a fan may be attached between first pump 101 and second pump 102 for cooling when system 100 is operational.

Because system 100 defines a closed loop system, first pump 101 and second pump 102 are cooperatively configured to direct fluid at a variety of stages of system 100 as long as any intervening valves are opened. For example, first pump 101 and second pump 102 may be configured to cooperate to draw solvent from solvent collection container 115 to solvent source container 120. Further, first pump 101 and second pump 102 are configured to cooperatively communicate at least a portion of post-extraction solvent evaporated within extract container 170 to solvent collection container 115.

Similarly, first pump 101 and second pump 102 may be configured to cooperatively direct extract solution output from the detachable canisters to extract container 170. In some examples, backflow pressure produced by first pump 101 and second pump 102 provide some or all of the pressure used by solvent conditioner 130 to pressurize solvent prior to introducing it to the solvent containers.

First pump 101 and second pump 102 collectively produce a flow rate sufficient to accomplish each of the aforementioned functionalities. Some examples include more or fewer pumps connected in series. Additional pumps may provide additional pumping power, whereas fewer pumps may save on operating costs.

As FIG. 1 shows, solvent collection line 190 is configured to pass through condenser 105 between second pump 102 and solvent collection container 115. Condenser 105 is configured to cool post-extraction solvent pumped by first pump 101 and second pump 102 prior to the solvent reaching solvent collection container 115. By cooling the post-extraction solvent, condenser 105 allows the post-extraction solvent to be stored and collected as a liquid.

As FIG. 1 illustrates, solvent collection container 115 is connected in fluid communication with extract container 170 through solvent collection container 115 and solvent source container 120 via a storage container line 194. As FIG. 1 shows, solvent collection container 115 includes a collection container input 117 and a collection container output 118. Solvent collection container 115 is configured to collect post-extraction solvent separated from the distilled solute within extract container 170 and directed through solvent collection line 190.

Solvent collection container 115 is configured to direct collected solvent to solvent source container 120 upon collecting a maximum amount of collected solvent. In some configurations, solvent collection container 115 is configured to communicate collected solvent upon exceeding its storage capacity. In other examples, solvent collection container 115 is configured to communicate collected solvent upon the collected solvent reaching the end of collection container output 118. When the collected solvent reaches collection container output 118, the suction force produced by first pump 101 and second pump 102 draws collected solvent through the collection container output 118 to refill solvent source container 120.

Solvent collection container 115, solvent source container 120, and extract container 170 define volumes that are operatively paired with one another. Extract container 170, solvent source container 120, and solvent collection container 115 may, at times of operation, be configured to receive all of the fluid from the preceding fluidly connected elements. Accordingly, solvent collection container 115 and solvent source container 120 are sized to ensure sufficient storage space for any post-extraction solvent output by extract container 170.

To ensure sufficient headroom, the combined volume of solvent source container 120 and solvent collection container 115 may be equal to the volume of extract container 170. Likewise, extract container 170 may define a volume equal to the combined volume of solvent source container 120 and solvent collection container 115 to provide sufficient headroom to be filled with all of the solvent initially contained by solvent collection container 115 and solvent source container 120. In some examples, one or more of solvent source container 120, solvent collection container 115, and extract container 170 may be sized larger than needed, which may guarantee sufficient headroom.

Although solvent collection container 115 and solvent source container 120 are distinct containers in system 100, this disclosure contemplates that a single container could serve as both a solvent collection container and solvent source container. Further, system 100 may be operable with a single extraction vessel (e.g., only detachable cannister 150) and without one or more of pumps 101, 102, condenser 105, and/or conditioner 130, particularly for thermally driven systems, which rely on pressure and/or temperature differential between/among extraction system components for moving solvent and/or solute between and among said extraction system components.

A key advantage of system 100 is a completely electric operation, with electric jackets 198 and 199 may respectively cool containers 115 and 120 to condense solvent. In such cases, system 100 may omit condenser 105 because container 115 is a container (e.g., a tank) that is cooled to a condensing temperature. Electric jackets may be capable of either heating or cooling or both heating and cooling. For containers 115 and 120, electric jackets 198 and 199 may apply heat for creating a head pressure for moving solvent into a downstream container or vessel, achieving at least one of a head pressure target pressure and a head pressure temperature. While electric jackets 198 and 199 are applying heat, electric jacket 152 and/or 179 may cool a respective vessel (e.g., one of 130, 150, 163, and 164) and/or container 170 for establishing a thermal gradient between or among extraction system components, thus inducing a flow of solvent or solution between or among extraction system components.

For assisting solvent flow, solvent conditioner 130 may be cooled or container 170, assuming container 170 is fluidly connected to container 120. The process could be repeated while moving solvent/solution from solvent conditioner 130 to one of detachable canisters 150, 163, and 164, as well as from said detachable canisters 150, 163, and 164 to container 170. Some embodiments may rely on a combination of pumps and temperature differentials to move solvent or solution within system 100.

Etraction components can be cascaded such that each container is warmer or colder than the previous or "upstream" extraction system component. For $CO_2$ applications, maintaining a heated solvent temperature is important, so container 120 may be heated to a first temperature via electric jacket 199 and solvent conditioner 130 may be set at the same or a higher, second temperature via electric jacket 152 before being introduced into an extraction vessel (e.g., cannister 150). In such applications, solvent conditioner 130 may be a heat exchanger rather than a container dimensioned similarly to an extraction vessel, as shown in FIG. 1.

For ethanol and hydrocarbon extractions, cold-temperature extractions may be desired. In such cases, electric jacket 199 may cool container 120 (and the solvent therein) to a first temperature and electric jacket 152 may be set at the same temperature or to a lower temperature for cooling solvent within solvent conditioner 130.

In thermally driven embodiments, an electric jacket may warm up, relative to a solvent temperature, to create a head pressure rather than change the temperature of a solvent or solution. For example, electric jacket 152 of conditioner 130 may slight heat up for moving solvent from conditioner 130 to vessel 152. Vessel 152's temperature may also be maintained via an additional electric jacket 152 for maintaining an extraction temperature, creating a temperature differential, head pressure, and/or establishing a distillation temperature for removing residual solvent residing in the botanical material such as mushrooms, lavender, cannabis, hemp, and the like or a derivative thereof (e.g., trim, kief, hash).

Although electric jackets may supplement water-based jacketed systems (e.g., electric insulation), system 100 may completely dispense with the need for any water jackets and thus eliminate associated machinery (e.g., chillers, heaters, water pumps) or substantially decrease the cooling/heating demands thereof. One inventive aspect is a purely electrical extraction system in the sense that all heating and cooling is providing via electronic heaters, coolers, or combination heater-coolers, such as Peltier/thermoelectric elements adapted and arranged to heat and cool. For "pump-optional", thermally driven systems that are also purely electrical, such extraction systems operate quite simply, efficiently (in terms of energy consumption, solvent recovery, and physical footprint), and precisely, especially when coupled with temperature sensors.

Although electric jacket 179 and three of electric jackets 152 are not shown to be connected to electrical outlet 89, this omission is merely for clarity of FIG. 1. Electric jackets, in general, may be coupled to said electrical outlet 89 or to an electrical outlet or electricity source that is external to structure 106 and/or system 100.

FIG. 3 is a schematic view of example extraction system 300, which includes support structure 306 and extraction vessel system 340. Extraction vessel system 340 includes extraction cartridge 302, extraction vessel 350, and extraction vessel lid 351, which is mechanically couplable to vessel 350 for removing cartridge 302 and establishing a seal for vessel 350. Vessel 350 is generally fixed to support structure 306, but may be removeable via tools for replacement or maintenance. Cartridge 302 may be rigid or a deformable mesh "bag" that contains the source material.

Figure 4A:
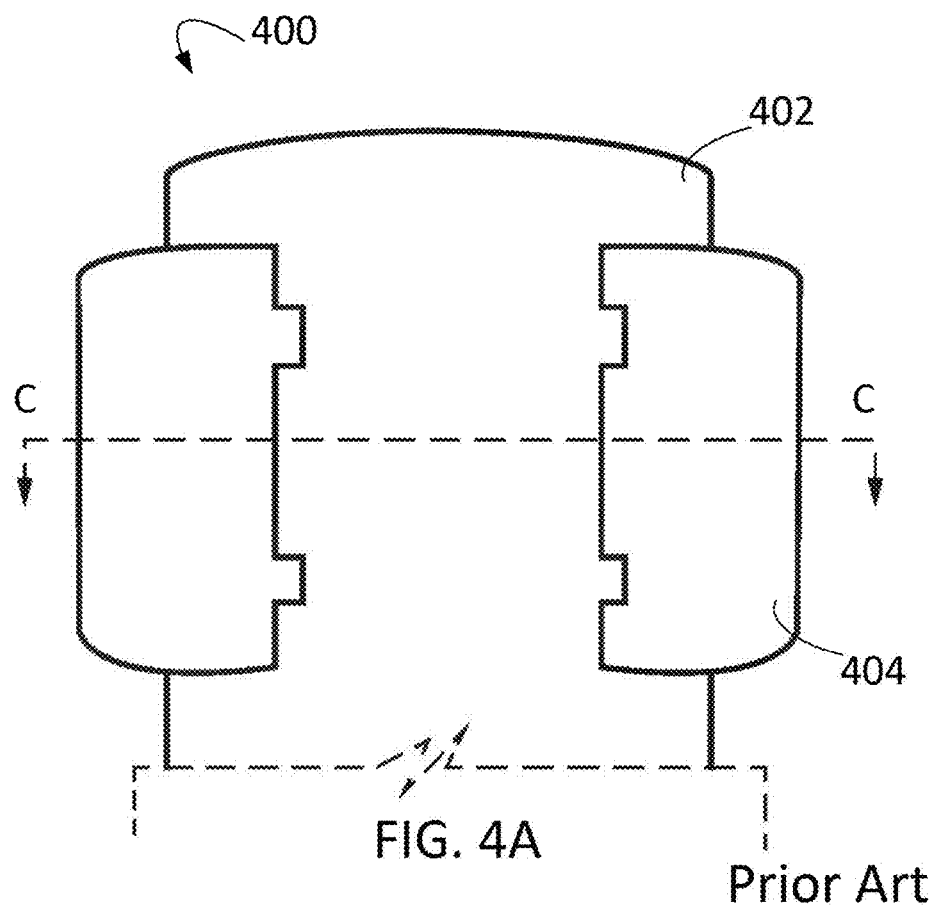
FIGS. 4A and 4B are different views of a known example extraction vessel attachment system.
Figure 4B:
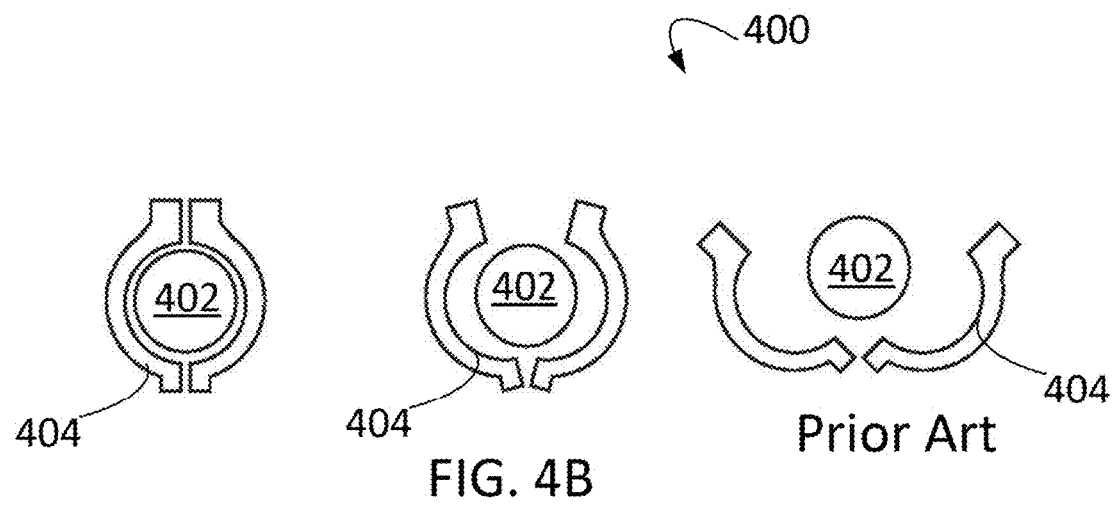

FIGS. 4A and 4B show extraction vessel attachment system 400, with FIG. 4B being a cross-sectional view taken along line C of FIG. 4A. System 400 includes extraction vessel 402 (only the top portion is shown) and a "clam-shell" clamp 404, which fastens vessel 402 to system 400 as an upper mechanical interface. A corresponding lower mechanical interface (not shown) may further fasten vessel 402, which may be similar or different to a clam-shell design.

Figure 5:
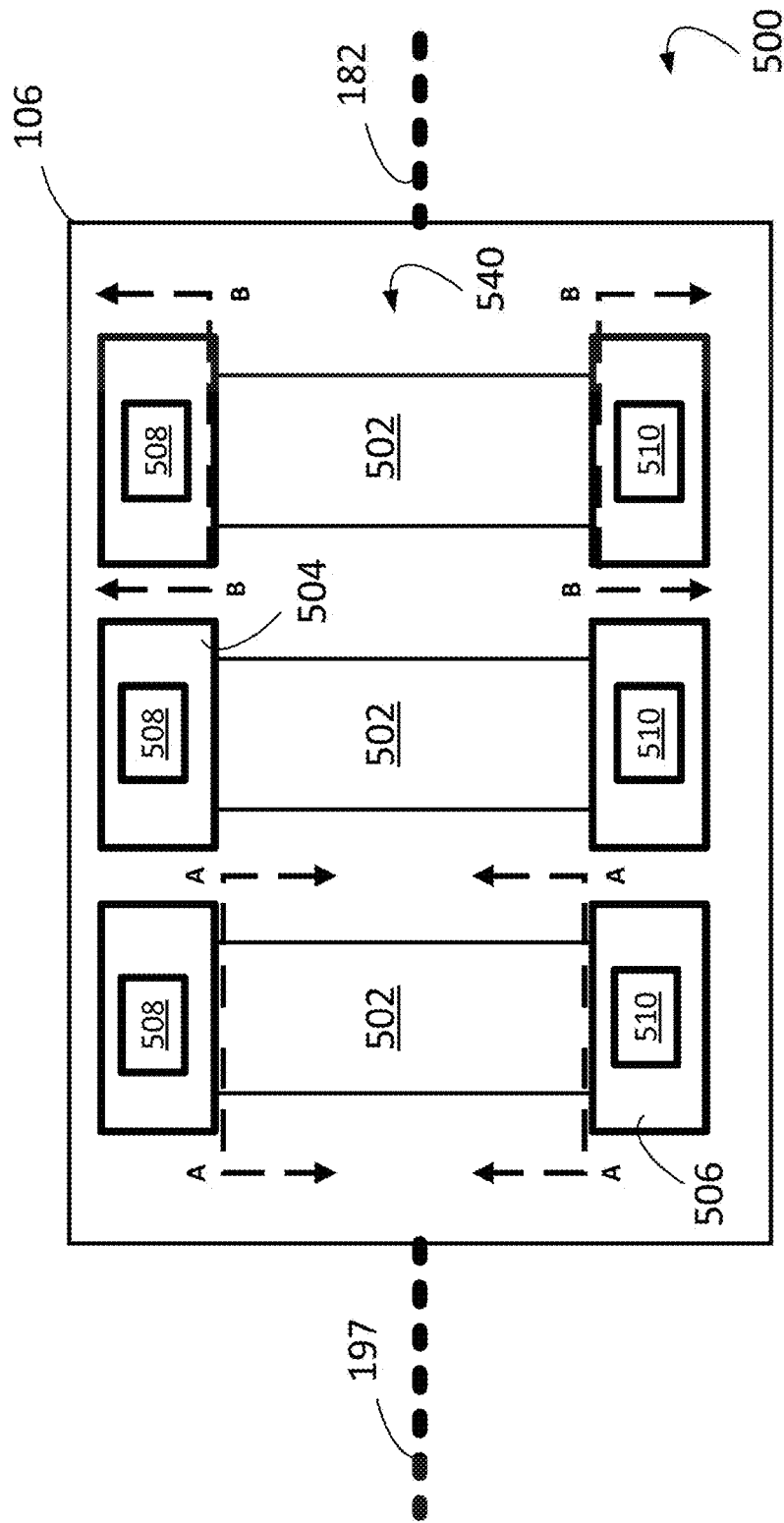
FIGS. 5-13 are schematic views of example extraction systems.

FIG. 5 is a schematic view of example extraction system 500, which includes extraction vessel system 540. Extraction vessel system 540 may have one or a plurality of extraction vessels 502, which may be coupled to support structure 106 via one or more mechanical interfaces such as upper mechanical interface 504 and/or lower mechanical interface 506. A mechanical interface mechanically interfaces an extraction vessel with support structure and can additional fluidly and/or electrically interface an extraction vessel with external systems or components such as controllers, solvent sources, separation tanks, among other examples.

Example interfaces are shown in FIGS. 2 to 4. Electric thermal elements include electric heating and electric cooling elements. Electric heating or cooling elements may be variously arranged on or within a mechanical interface and thereby thermally couple with an extraction vessel. Lower mechanically interface may define a substantially planar surface for accepting a vessel. A resistive heater or plurality thereof (an example electric heating element(s)) and/or a plurality of thermoelectric devices (example electric cooling, heating, or cooling and heating elements) may be arranged along the planar surface of a mechanical interface for thermally coupling with an extraction vessel.

A mechanical interface may include a thermal jacket that defines an orifice or aperture that is dimensioned to receive an extraction vessel and is thermally coupled with an electric cooling and/or heating element. In the case of clam-shell interfaces, electric cooling and/or heating elements may be arranged on or within the clam shell components, as shown in FIG. 21.

Figure 6:
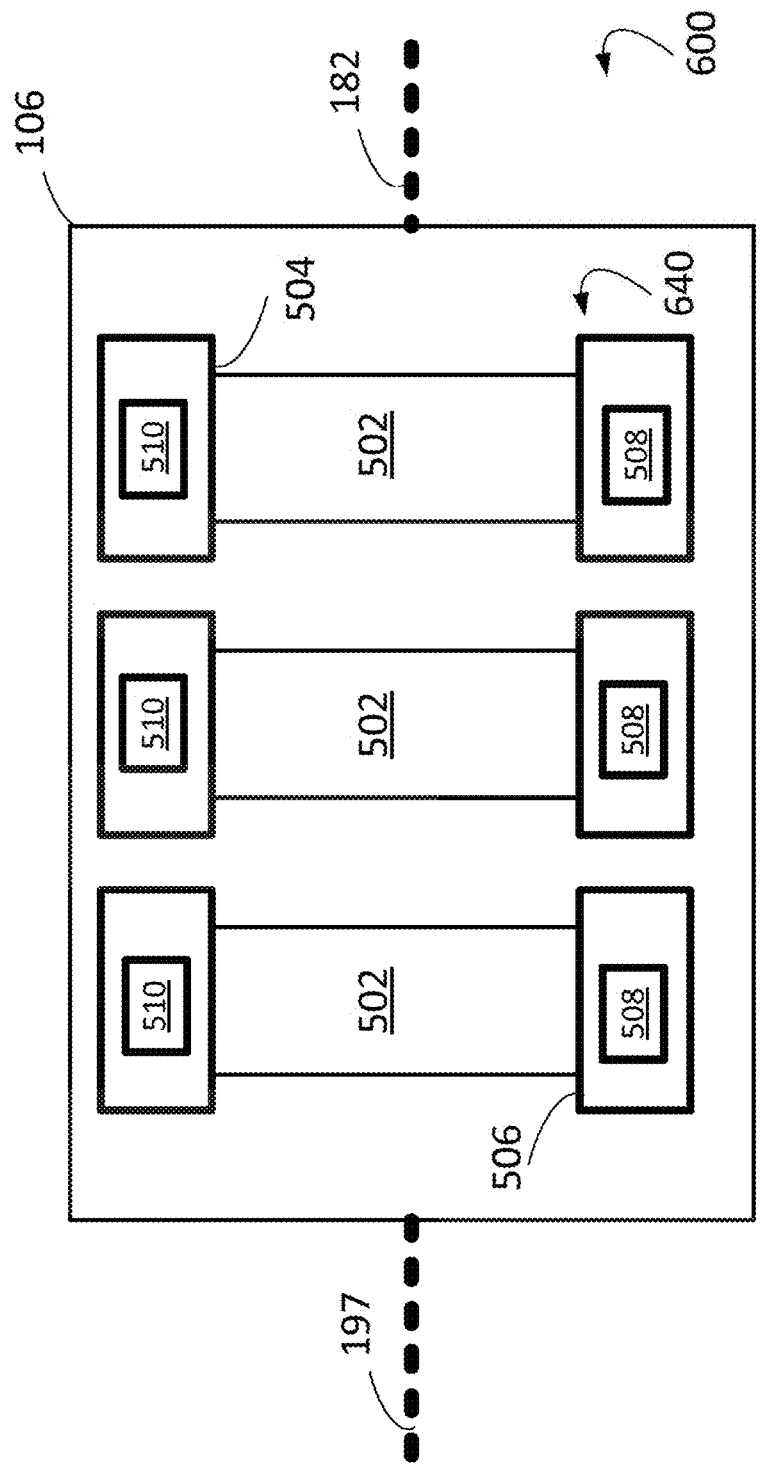

As shown in FIG. 5, upper mechanical interface 504 includes electric heating element 508 and lower mechanical interface 506 includes electric cooling element 510 (e.g., a thermoelectric device which may also be arranged to heat). The respective cooling and heating elements' position may be reversed, as shown in extraction vessel system 640 of FIG. 6. Cooling element 510 and heating element 508 may be singular unit, include a plurality of electric elements, or omitted from an interface, as shown in FIGS. 7-10.

Figure 7:
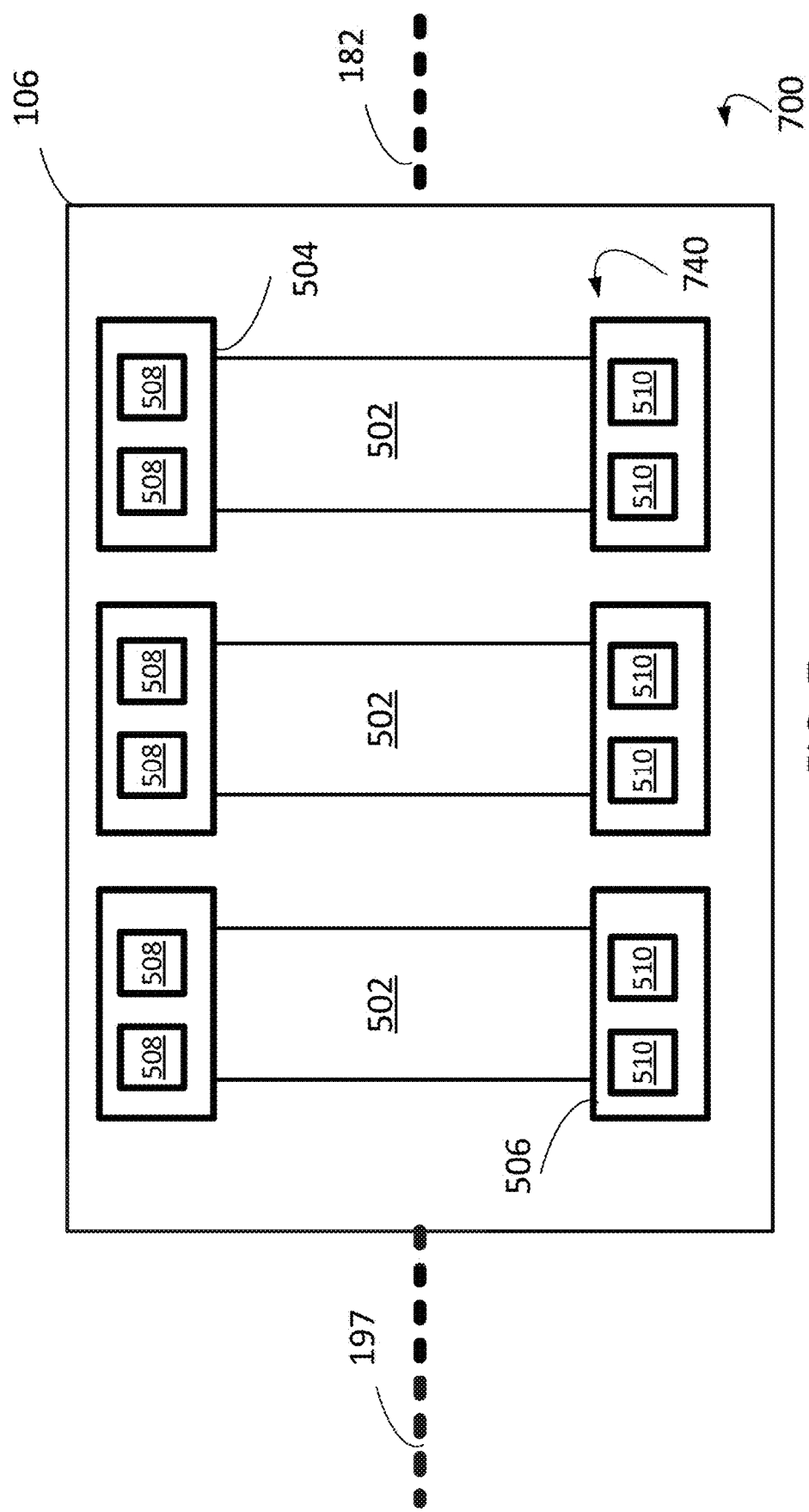
Figure 8:
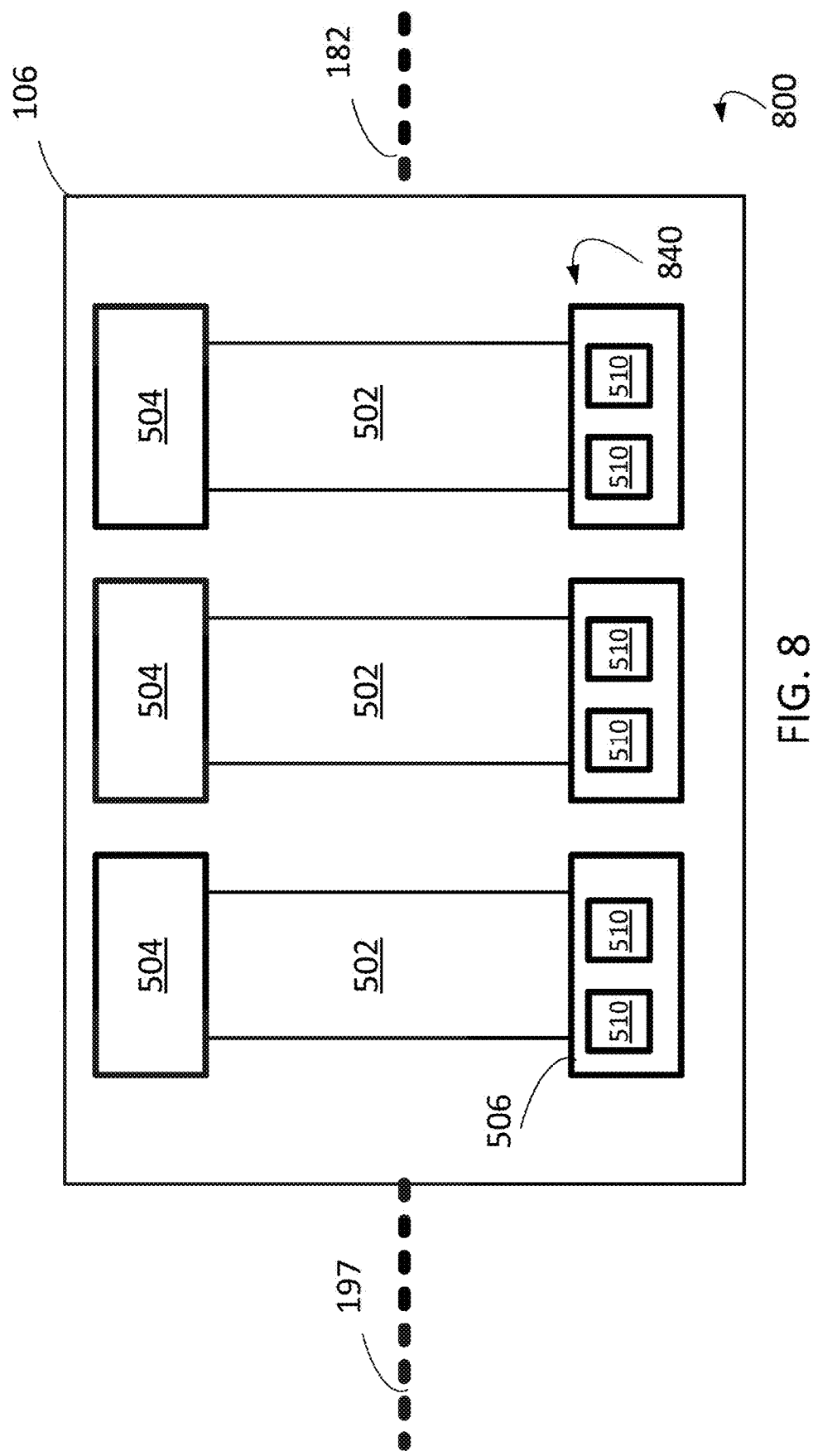

As shown in FIG. 7, extraction vessel system 740 includes a plurality of heating elements 508 and cooling elements 510 respectively arranged on or in upper mechanical interface 504 and lower mechanical interface 506. As shown in FIG. 8, a plurality of cooling elements 510 may reside on or in lower mechanical interface 506. Additionally or alternatively, a further plurality of cooling elements may reside on or in upper mechanical interface 504 (not shown in FIG. 8).

Figure 9:
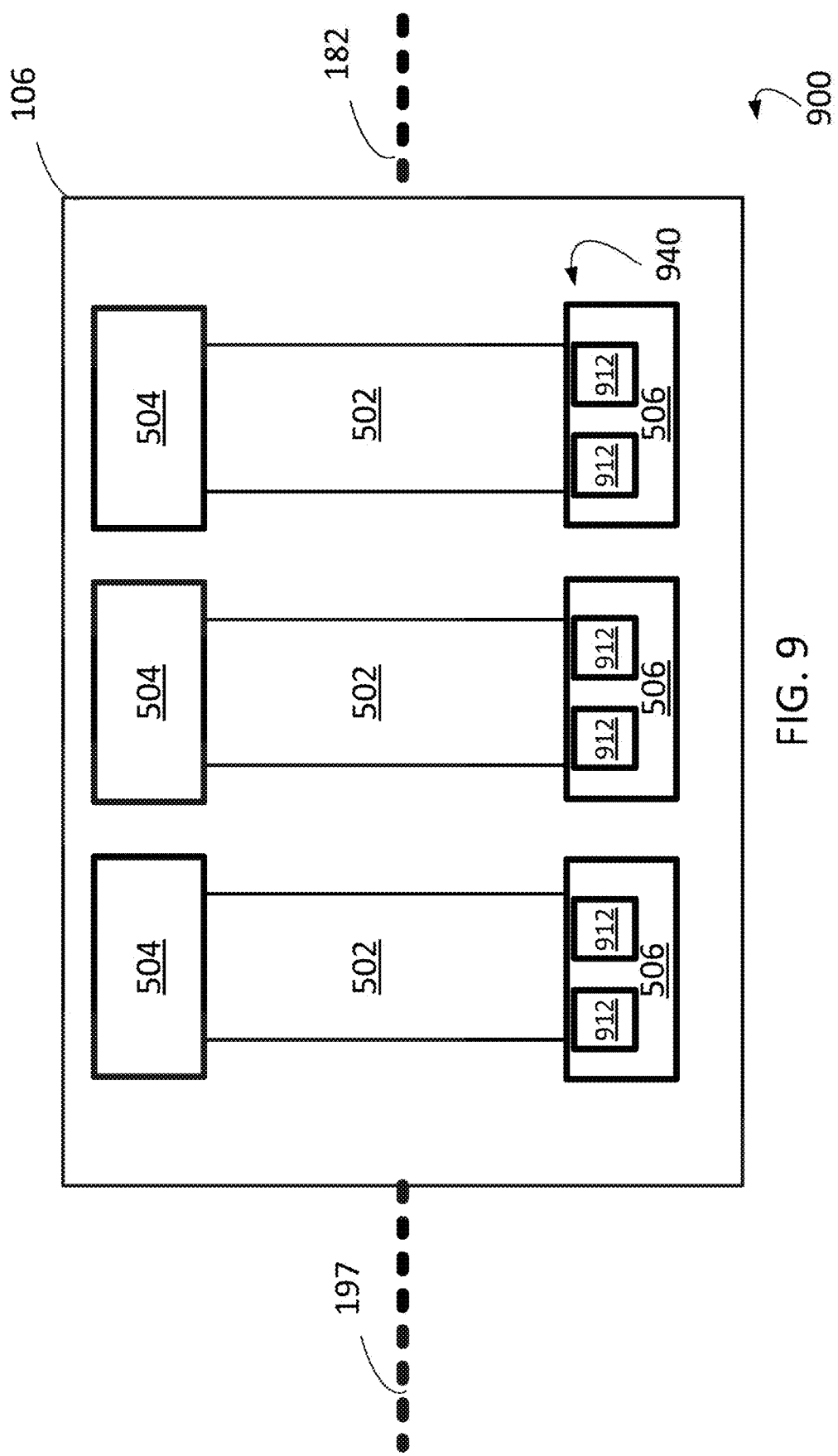
Figure 10:
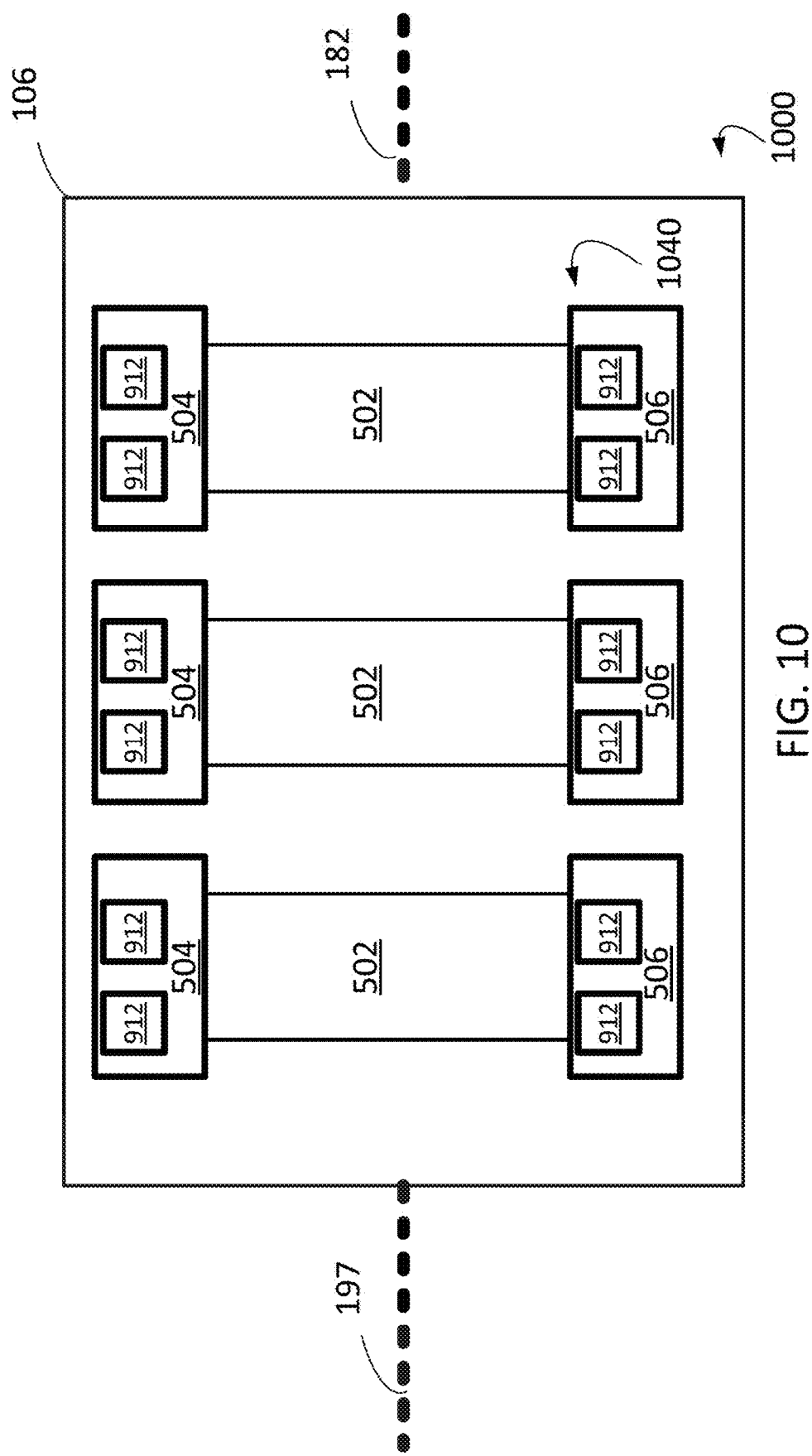

As shown in FIG. 9, a plurality of thermoelectric elements 912 may reside on or in lower mechanical interface 506. Additionally or alternatively, a further plurality of cooling elements may reside on or in upper mechanical interface 504, as shown in system 1040 of FIG. 10. Thermoelectric elements 912 may selectively heat and cool extraction vessel 502 and thus may be able to perform one or more functions of a water or electrical jacket, as discussed above.

Figure 11:
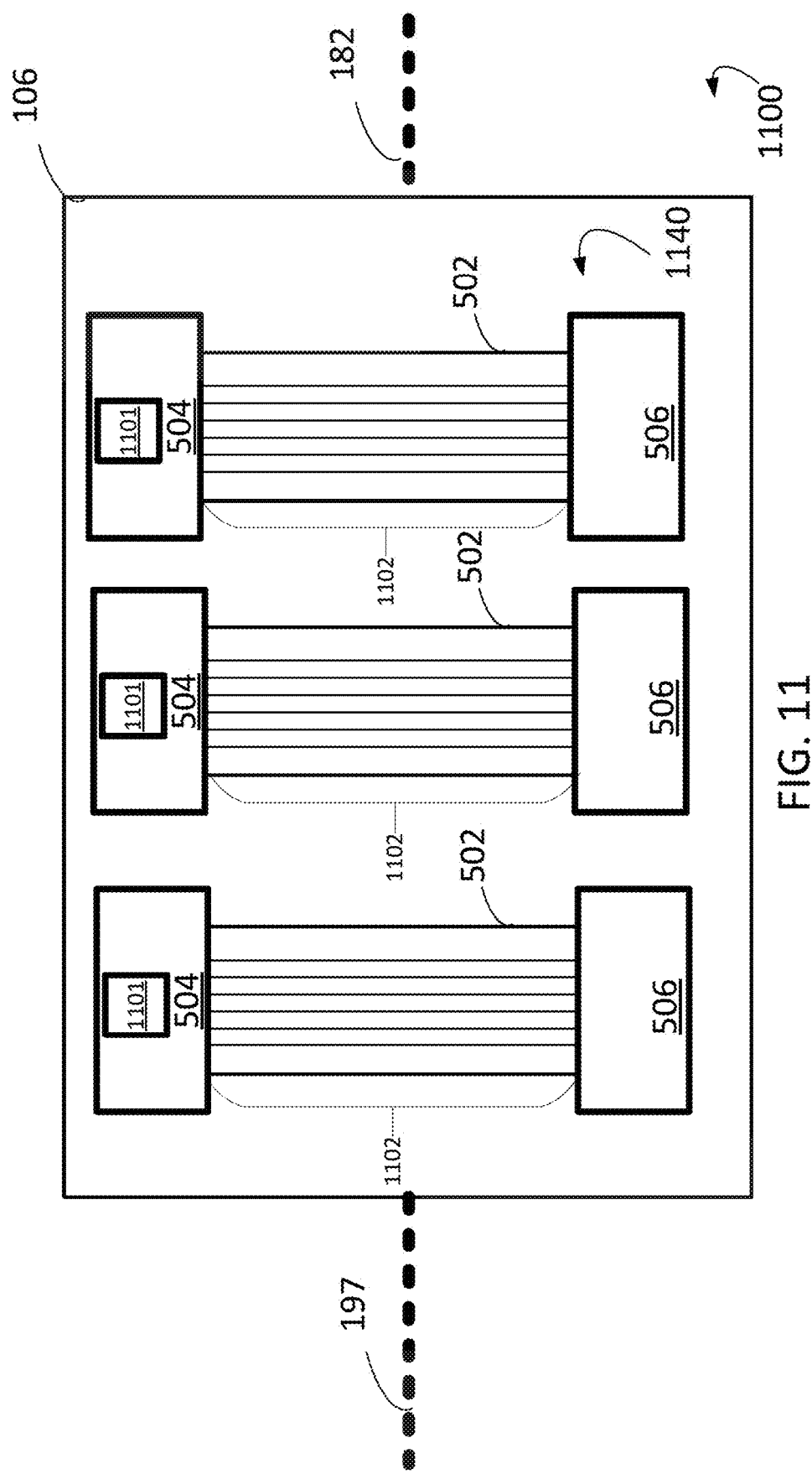

As shown in FIG. 11, extraction vessel system 1140 includes electrical connection 1101, which electrically couples electrical elements 1102 with a power source and/or controller (not shown). Electrical elements 1102 may be wire and/or resistive heating elements, among other possible electrical elements, arranged on or in extraction vessel 502.

Wire may be used to carry current to other electrical elements (e.g., heaters, coolers) that are electrically coupled to said wire and residing on or in an extraction vessel or otherwise thermally coupled thereto.

Figure 12:
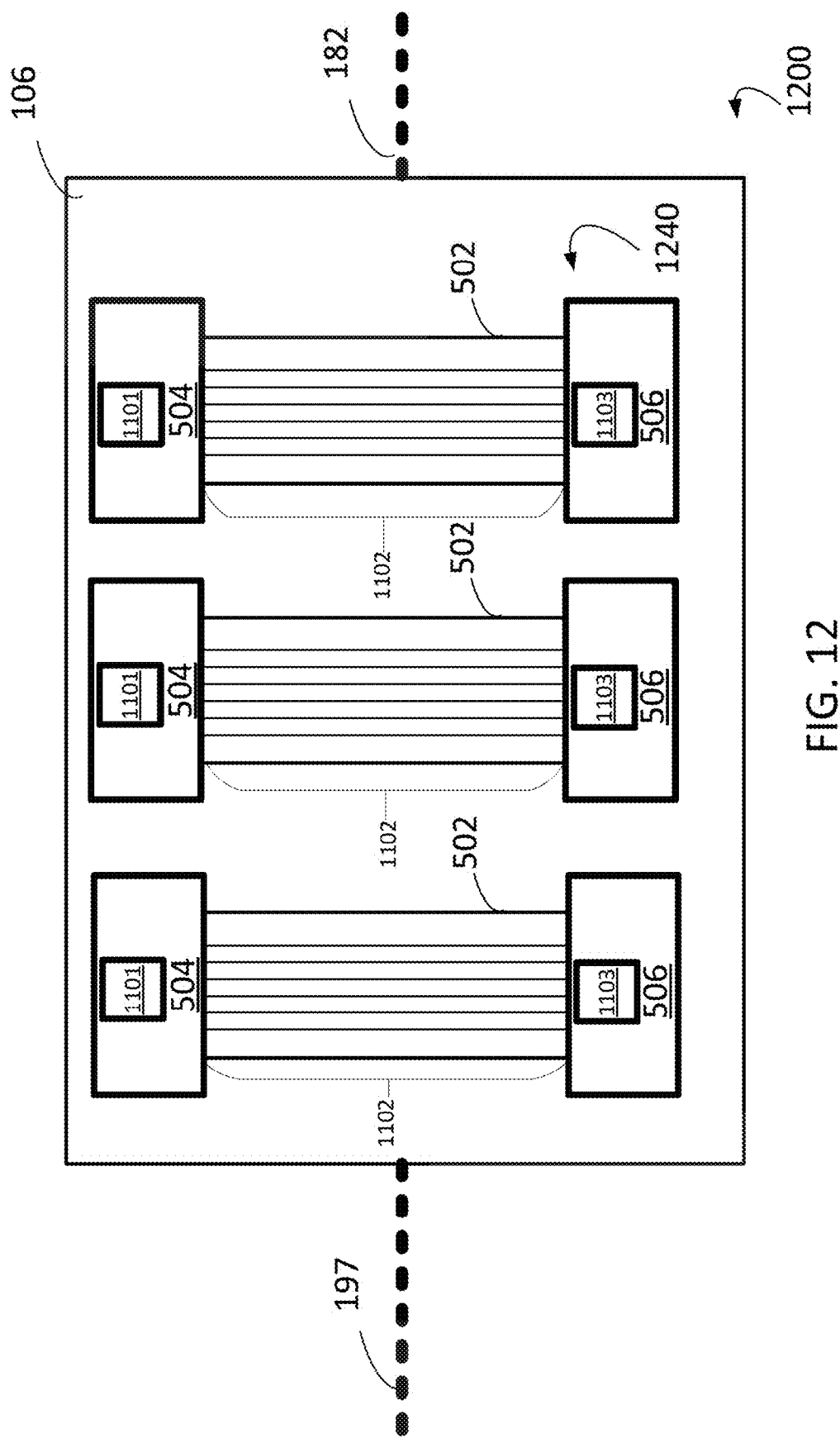

As shown in FIG. 12, extraction vessel system 1240 includes a second electrical connection 1103. In such embodiments, a current may be carried from connector 1101 to connector 1103 (or in the reverse direction) via at least electrical elements 1102. Electrical connectors 1101 and 1103 may electrically couple electrical elements 1102 with a power source and/or controller (not shown).

Figure 13B:
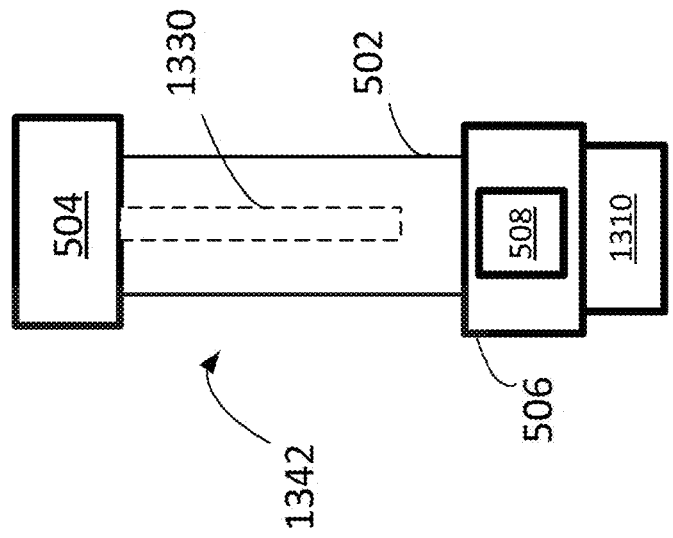
Figure 13A:
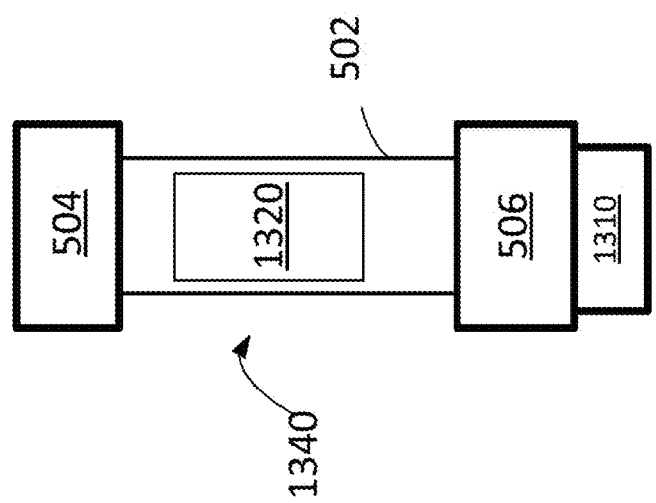

As shown in FIG. 13A, extraction vessel system 1340 includes electric jacket 1320 and thermoelectric device 1310. Lower mechanical interface 506 interfaces vessel 502 with device 1310 such that device 1310 is thermally coupled to vessel 502. Device 1310 may be mechanically coupled to vessel 502, interface 506, or both. In one example, vessel 502 couples to one side of interface 506 and device 1310 couples to an opposite side of interface 506, as shown in interface 1306 of FIG. 13D. Interface 506 may be made of steel or other metals that efficiently transfer heat or cold from device 1310 to vessel 502.

In one example, jacket 1320 may electrically heat vessel 502 and device 1310 may electrically cool vessel 502. The heating step may be applied before, during, or after the extraction process for setting or maintaining an extraction temperature or for evaporating solvent. In one example, jacket 1320 only heats and device 1310 only cools. Device 1310 may cool for establishing a temperature differential or setting or maintaining an extraction temperature. Together, jacket 1320 and device 1310 can provide a wide range of heating and cooling temperatures within the extraction vessel purely via electrical means (e.g., without using water jackets and the like).

As seen in FIG. 13B, extraction vessel system 1342 includes probe 1330, which resides within vessel 502. Probe 1330 is typically used for monitoring the temperature inside vessel 502 during extraction, but probe 1330 can be used to monitor pre- and/or post-extraction temperatures (e.g., a thermal differential temperature for inducing a solvent flow or distilling temperature for evaporating the remaining solvent from the botanical material). Probe 1330 may be used in conjunction with external sensors, such as temperature sensors of an electric jacket to control an extraction system temperature before, during, or after the extraction process. That is, a controller may receive both probe 1330 temperature data and external sensors for controlling an extraction system.

In some embodiments, temperature/thermal sensors may be distributed across the jacket so to measure temperatures of a vessel at different locations (e.g., sensors 1502 of FIG. 15). In embodiments that include independently controlling one or more thermoelectric devices, local hot or cold spots can be ameliorated. For example, the thermoelectric device(s) nearest the sensor that detects a local hot/cold spot, a control may control said thermoelectric device(s) to suppress said cold/hot spot such that the vessel is of a more uniform temperature, with minimum gradient and/or hot/cold spots.

Figure 29:
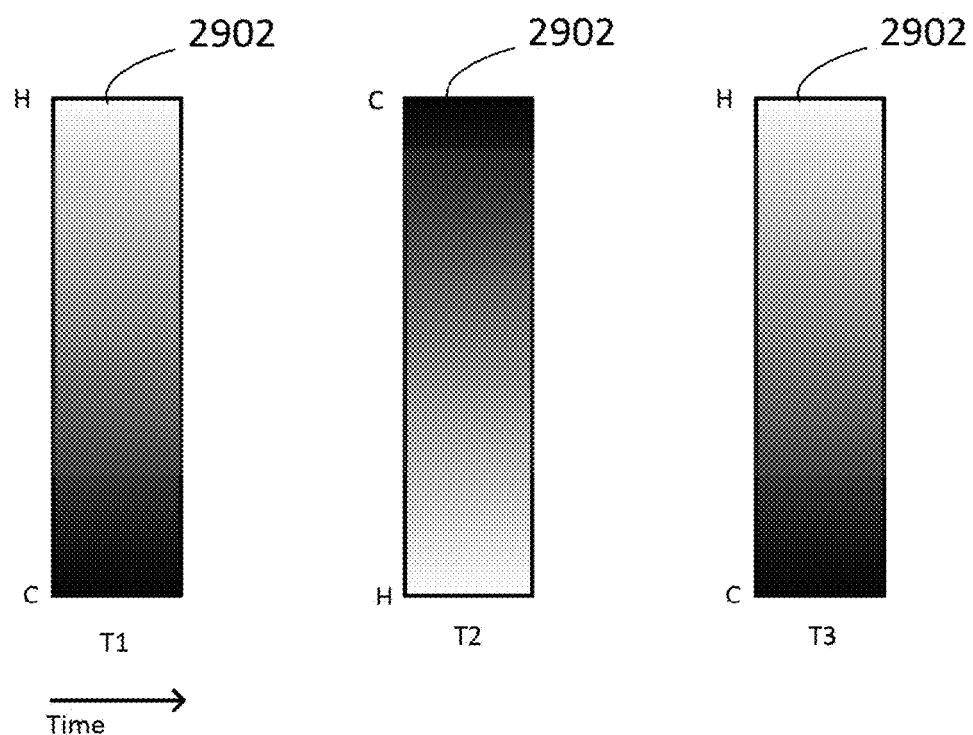
FIG. 29 shows thermal gradients across an extraction vessel.

Additionally or alternatively, independently controlled thermoelectric devices may be sub-grouped in "rings" that surround a vessel at a lateral location or "slice" (e.g., sub-groupings 508a-e shown in FIG. 15). This and other possible arrangements and sub-groupings may then be utilized to increase a thermal gradient that generally or approximately spans the length of a vessel (e.g., a sub-grouping at a first lower temperature and arranged at one end of the vessel and another sub-grouping at a higher temperature and arranged at another end of the vessel (and vice-versa)). As shown in FIG. 29, said thermal gradient may be inversed or a negative gradient applied such that the hot side of the vessel is now the cold side and vice-versa. This may be especially desired for driving solvent through a solute bearing material within an extraction vessel. For example, the gradient change may be repeatedly applied such that the hot and cold sides are switched during the extraction process.

Figure 13D:
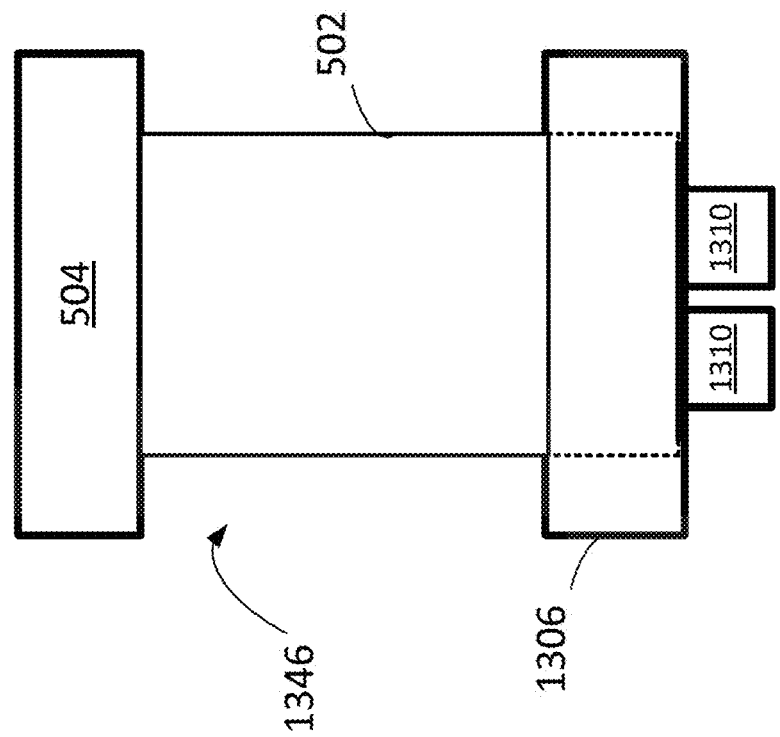
Figure 13C:
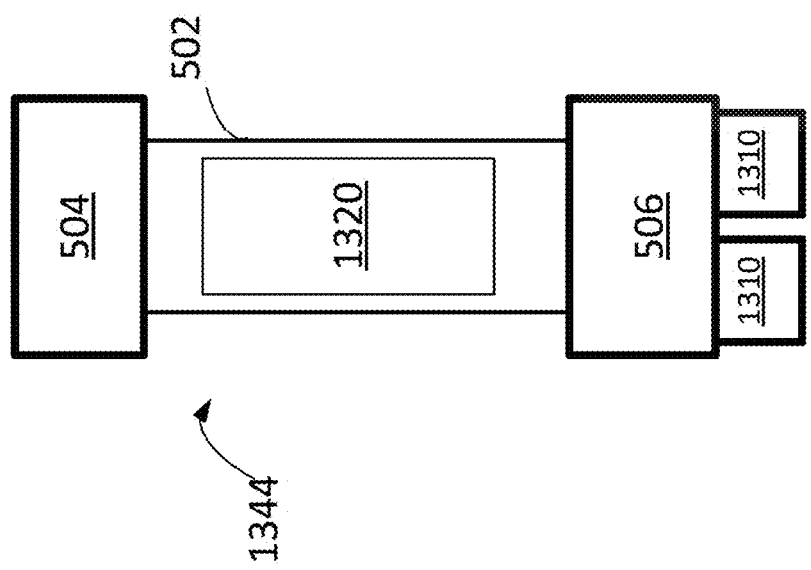

As seen in FIG. 13C, extraction vessel system 1344 includes a plurality of thermoelectric devices arranged below vessel 502. As seen in FIG. 13D, lower mechanical interface 1306 thermally couples devices 1310 with vessel 502. In one example, interface 1306 may be a thermal jacket. Interface 1306 may be a solid piece or hollow. Solid piece can efficiently transfer thermal energy, but hollow embodiment may include water/liquid jackets. In such embodiments, devices 1310 may thermally assist the thermal jacket by applying the same or similar temperature as the liquid flowing through the interface 1306. Said embodiments may reduce the thermal/energy requirements of a liquid chiller and/or heater feeding the liquid jacket.

Alternatively, interface 1306 may only heat, for example, via a water jacket, and devices 1310 electrically (at least) cool or vise-versa (e.g., a water jacket that only cools and the devices 1310 at least heat). In such cases, the liquid jacket system is simplified, since the liquid thermally regulating interface 1306 needs only to either heat or cool, but not both since device 1310 can provide the cooling or heating thermal regulation, as needed/desired.

Figure 14:
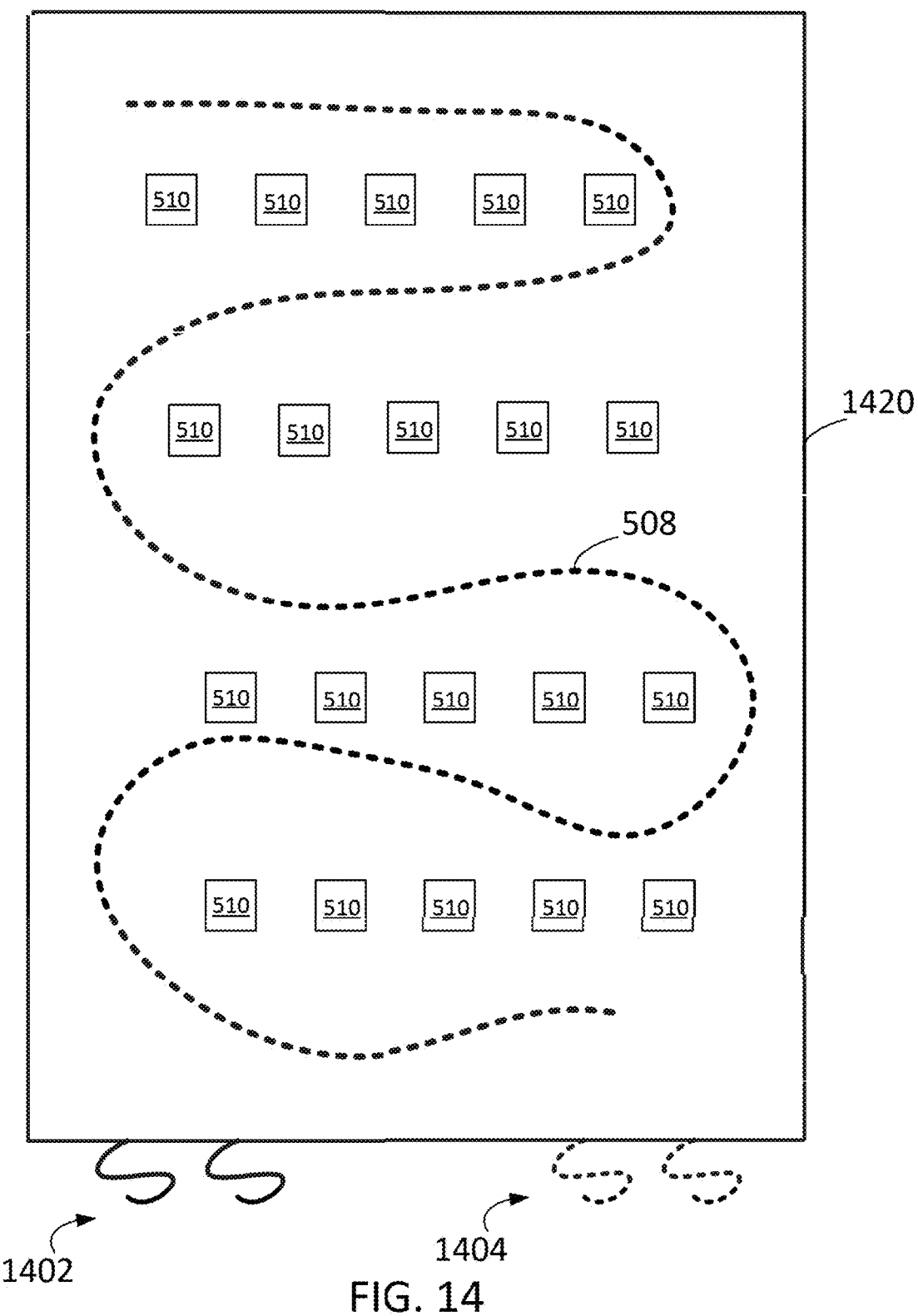

As seen in FIG. 14, electric jacket 1420 may include resistive heating element 508 (e.g., a resistance wire) and a plurality of cooling elements 510. Electric jacket 1420 includes electrical leads 1402 and 1404 to carry electrical energy respectively to heating element 508 and cooling elements 510.

In controller embodiments, jacket 1420 may include leads 1522 which are operably connected to controller 1524. Controller 1525 may then be operably connected to elements 508 and/or 510 by selectively apply electrical signals to elements 508 and/or 510 and/or a sub-grouping thereof.

Cooling elements 510 may further be heating elements in thermoelectric embodiments. In such embodiments, resistive heating element 508 may be optional, as represented by a dashed lined, because elements 510 may be selectively operated, via a switch and/or a controller, to heat and cool. Alternatively or additionally, elements 510 and heating element 508 may both heat an extraction system component for a period of time. Cooling elements 510 may each be a thermoelectric device or form a single thermoelectric device. In other works, jacket 1420 may comprise a single thermoelectric device or a plurality of thermoelectric devices, which may be controlled individually or in sub-groups.

Electric jacket 1420 includes flexible material for jacket 1420 to stretch or deform for wrapping around an extraction system component such as a solvent source, an extraction vessel, or separation vessel.

One or both of the heating element 508 and cooling elements 510 may be embedded or otherwise surrounded by the flexible material. One or both of the heating element 508 and cooling elements 510 may be mounted on an external surface of jacket 1420 such that the heating element 508 and/or cooling elements 510 may come in direct, physical contact with an external surface of an extraction system component when jacket 1420 is coupled with said extraction system component. This may be a "cool" side of elements 510 that contacts the extraction system component or said cool side may be changed via a switch and/or controller so to alternatively heat or cool or establish a thermal gradient across said extraction system component.

As seen in FIG. 15, electric jacket 1520 includes a plurality of heating elements 508, which may be independently controllable or grouped into sub-groupings 508a-e. In some embodiments, controller 1524 is electrically coupled to each sub-grouping 508a-e such that each sub-grouping is independently controlled or controllable. In such embodiments, controller 1524 may apply pre-defined thermal gradient across an extraction vessel. Alternatively or additionally, controller 1525 may receive temperature data from thermal sensors 1502, which may provide temperature data that is measured from different locations of the extraction vessel and/or jacket 1520. In embodiments in which sensors 1502 are thermally coupled to a vessel, controller 1524 may be configured or configurable to suppress thermal variations such as hot spots, cold spots, thermal gradients and/or induce hot spots, cold spots, and/or thermal gradients. In such embodiments, controller 1524 may implement a variety of thermal programs and management algorithms, alone, and/or in conjunction with other controllers (e.g., software applications; slave and/or master controllers).

Heating element 508 may be a composite heating element, a metal element, ceramic (e.g., PTC ceramic plates), semiconductor, thick film heating element, and/or polymer PTC heating element (e.g., a positive temperature coefficient rubber substrate with wiring). Electric jacket 1520 includes electrical leads 1402 and 1404 to carry electrical energy respectively to heating elements 508 and cooling elements 510.

Controller 1524 may communicate with one or more of the aforementioned other controllers via communication module 1526. Communication module 1526 may wirelessly communicate with one or more standardized wired or wireless communication protocols (e.g., USB, Ethernet (e.g., IEEE 802.3), IEEE 802.11, Bluetooth) for monitoring and/or controlling jacket 1520. In wireless communication embodiments, jacket 1520 may simply be connected to a power source and operably connect controller 1524 via module 1526 to an external controller and/or other electric jackets (e.g., via direct connections and/or loop, mesh, or other network topologies). Such embodiments can thus bring control and automation to various extraction processes by coordinated control of one or a plurality of electric jackets with minimum wiring.

Electric jackets may include deformable material for wrapping around an extraction system component and/or may be pads arranged to abut one side of an extraction system component, such as the bottom side of a separator vessel.

FIGS. 16, 17A, and 17B show a prior art extraction system and electric heating jackets. Solvent vessel 1602 is fluidly coupled to extraction vessel 1604 with line 1603. Both vessels 1602 and 1604 have an electric heating jacket, respectively electric heating jackets 1606 and 1608. The "back" side of jacket 1608 is shown, which includes straps 1608a engaged with buckle 1608b for snugly coupling the deformable material of jacket 1608 with the outer surface of vessel 1604.

FIG. 17A shows electric heating 1706 with straps 1708 in a cylindrical form on its own, without an extraction system component such as a solvent or extraction vessel. FIG. 17B shows the jacket "flattened out" to show the deformable quality of jacket 1706. Straps 1708 may couple with buckles (not shown), Velcro, or other coupling structures for snugly coupling jacket 1708 to an extraction system component.

Figure 18A:
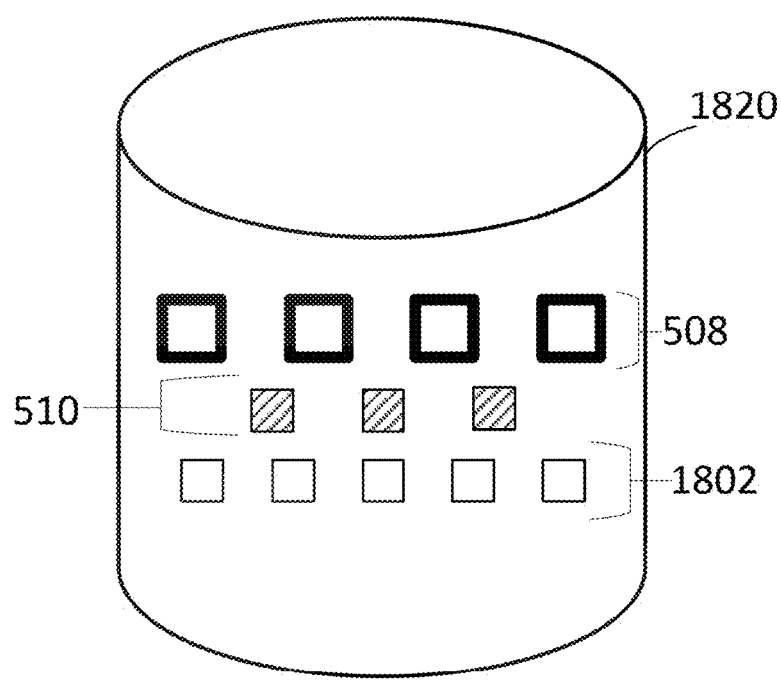

As seen in FIG. 18A, electric jacket 1820 includes heating elements 508, cooling elements 510, and temperature sensors 1802. Electric jacket 1820 is generally cylindrical shape (or is deformable into a cylindrical shape, like heating jackets of FIGS. 16 and 17) to surround, for example, a similarly cylindrically shaped extraction system component such as solvent source, an extraction vessel, or a separator although jacket 1820 may also surround cuboid and other non-cylindrical shapes.

Figure 18B:
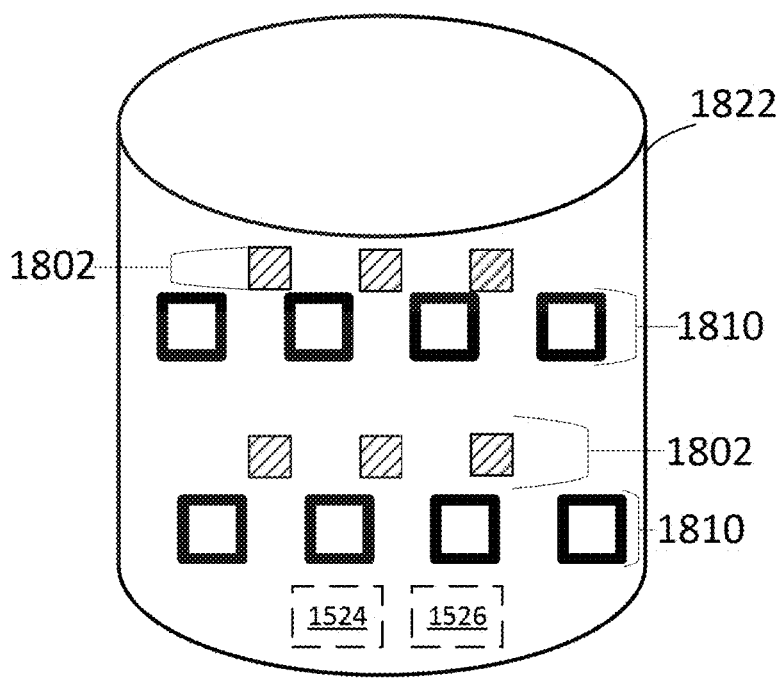

As seen in FIG. 18B, electric jacket 1822 includes thermoelectric devices 1810 and temperature sensors 1802. Thermoelectric devices 1810 may be electrically coupled to a power supply such that current flow direction can be switched, thus providing electric jacket 1822 both heating and cooling capabilities via devices 1810. Jacket 1822 may further include controller 1524 and/or communication module 1528.

In alternative embodiments, electric jackets 1820 and 1822 may omit the temperature sensors 1802. As shown, electric jacket 1820 and 1822 may also be called "electric sleeves" as jackets 1820 and 1822 are generally cylindrical and include deformable and/or elastic material that surrounds or otherwise couples with an exterior of an extraction system component, similar to a sweater sleeve surrounding an arm in that jackets 1820 and 1822 may be slid on and off an extraction system component. Jackets 1820 and 1822 may further include straps, buckles, and/or Velcro for releasably coupling a jacket with an extraction system component, as shown in FIGS. 16, 17A, and 17B.

As seen in FIG. 19A, separator system 1900 includes separator vessel 1902, electric jacket 1920 with thermoelectric devices 1910, and heating element 508. Vessel 1902 may physically lie on the heating element 508. Heating element may be a resistive heater or, in some embodiments, an induction stove. The induction stove may be adapted to heat the metal of separator vessel 1902 to a distillation temperature for distilling one or more solvents and/or components such as terpenes, flavonoids, and/or cannabinoids (e.g., THC).

For example, a coil of wire (not shown) may be under vessel 1902 and an alternating electric current is passed through said wire. The resulting oscillating magnetic field wirelessly induces an electrical current in vessel 1902. This large eddy current flowing through the resistance of vessel 1902 results in resistive heating.

As seen in FIG. 19B, separator system 1901 includes vessel 1902 on substrate 1904, which thermally couples vessel 1902 with one or more thermoelectric devices 1910 coupled to the other side of substrate 1904. In current direction switching embodiments, devices 1910 can both heat and cool vessel 1902, depending on the direction of current flowing through devices 1910.

As seen in FIG. 20, extraction system component 2002 is thermally coupled to liquid jacket 2004. Liquid jacket 2004 may receive a heated or cooled liquid (e.g., water, glycol) from a liquid heater or chiller (not shown). Electric jacket 2020 may be an electric insulator for liquid jacket 2004 by electrically cooling or heating via thermoelectric devices 2010. By electrically insulating liquid jacket 2004, the liquid heater or cooler supplying jacket 2004 may operate more efficiently. Electric jacket 2020 is shown as a partial cutaway at each side portions to more clearly show water jacket 2004, which is arranged between extraction system component 2002 and electric jacket 2020.

Figure 21A:
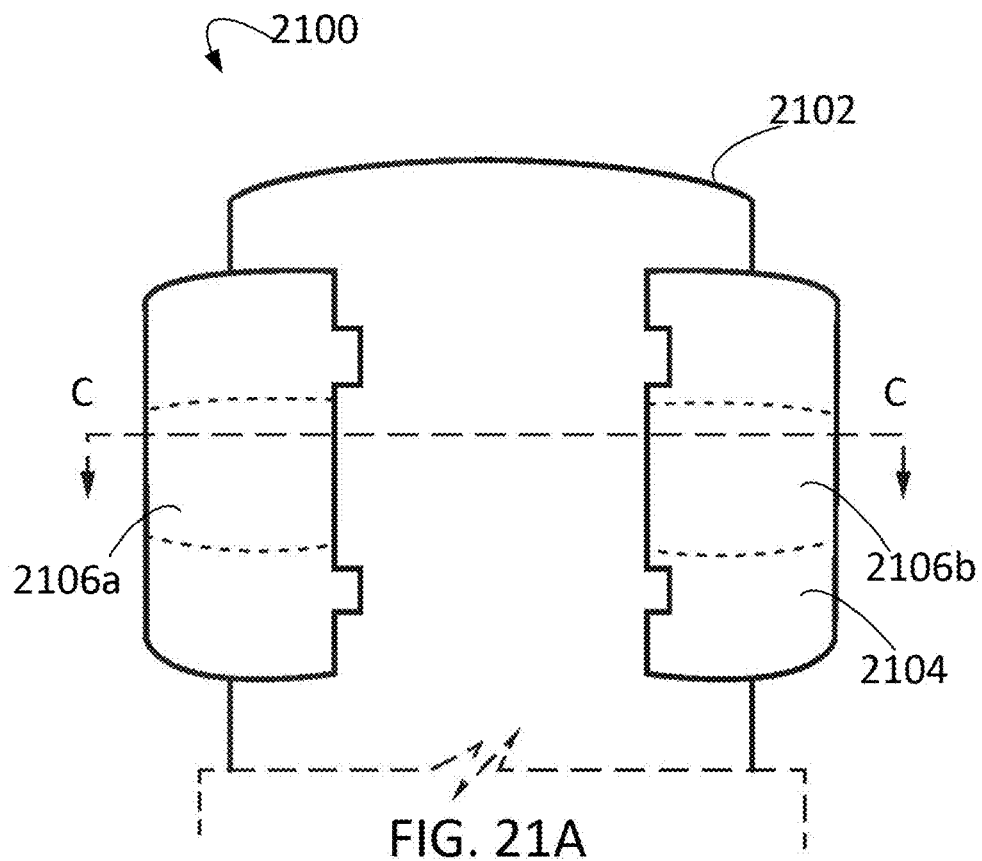
FIGS. 21 and 22 show example extraction vessel subsystems.
Figure 21B:
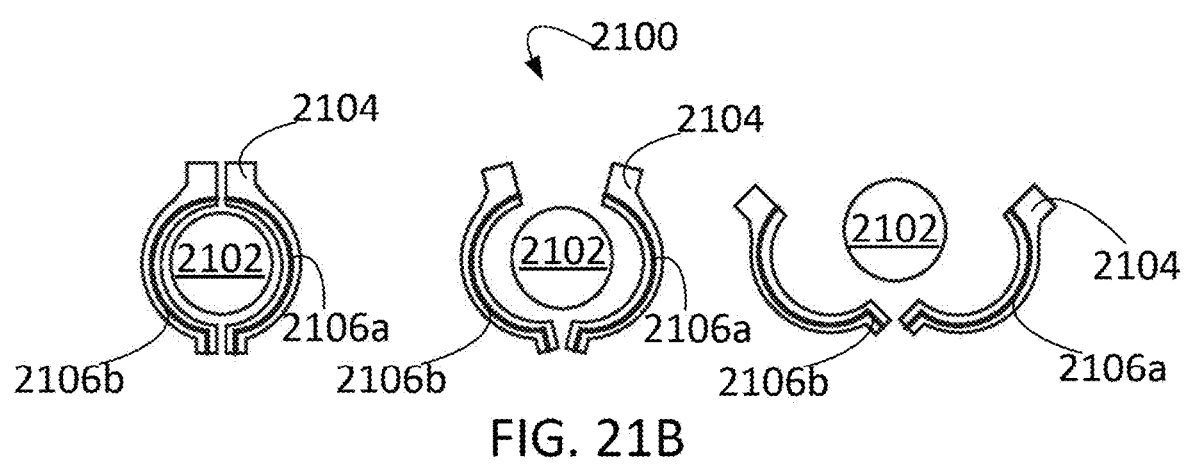

FIGS. 21A and 21B shows upper mechanical interface 2104, which includes electric elements 2106a and 2106b. Electric elements 2106a and 2106b may be separate heaters and/or coolers or may form a single heating and/or cooling element when upper mechanical interface is closed and/or locked around extraction system component 2102. That is, closing and/or locking mechanical interface 2104 results in electrically coupling electric element 2106a with electric element 2106b. Opening said interface 2104 may then electrically decouple elements 2106a and 2106b. In some embodiments, electric element 2106a with electric element 2106b may be electrically coupled elsewhere within system 2100 or coupled to separate circuits.

Mechanical interface 2104 thermally couples elements 2106a and 2106b to component 2102 as well as being a mechanical interface for component 2102. Elements 2106a and 2106b are arranged within interface 2104 and thus depicted with dotted lines in FIG. 21A. FIG. 21B shows a cross section taken along line C of extraction vessel 2102 with interface 2104 in different arrangements for opening and closing said interface 2104.

Figure 22A:
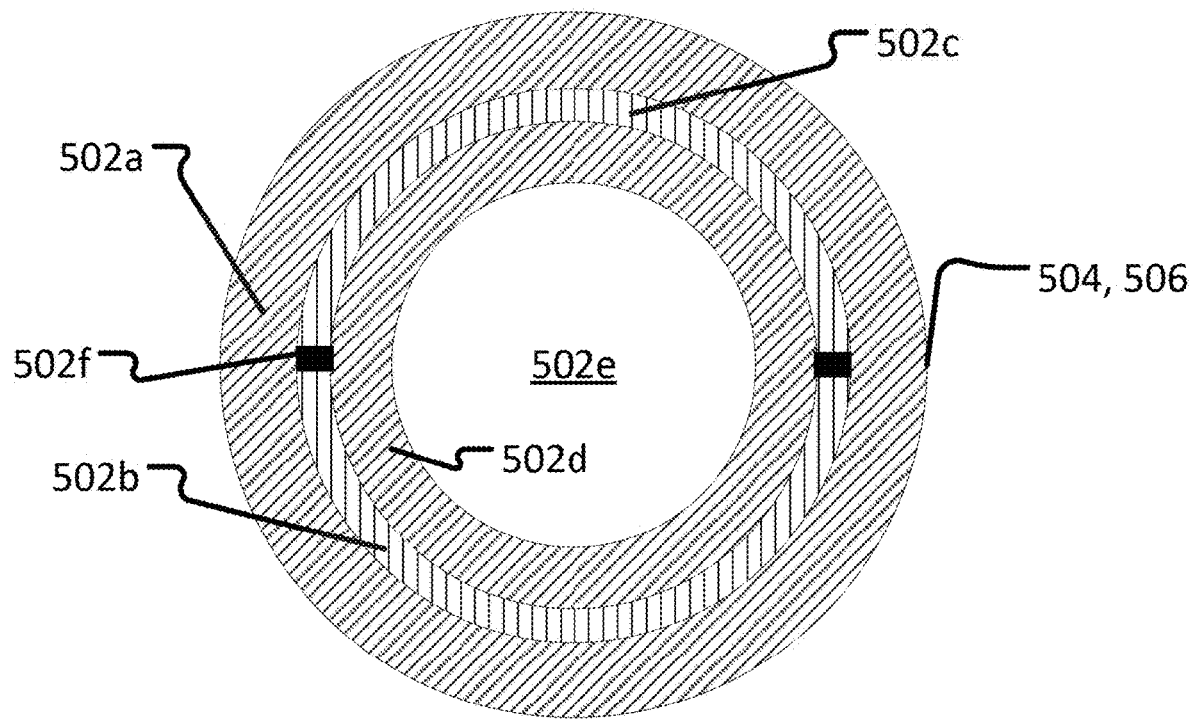

FIG. 22A shows a possible cross section taken along line(s) A of extraction vessel 502 of FIG. 5. Sections 502a and 502d may be insulative sections for conductors 502b and 502c. One or both of sections 502a and 502b may be ferromagnetic material for magnetically coupling with a magnet of an extraction system. In such embodiments, the act of coupling extraction vessels with an extraction system may be assisted or simplified by magnetically assisted mechanical coupling as the extraction vessel nears a magnet of an extraction system. The magnetically assisted mechanical coupling may result in a fluid and/or electrical coupling for operably coupling the extraction system with an extraction vessel.

Figure 22B:
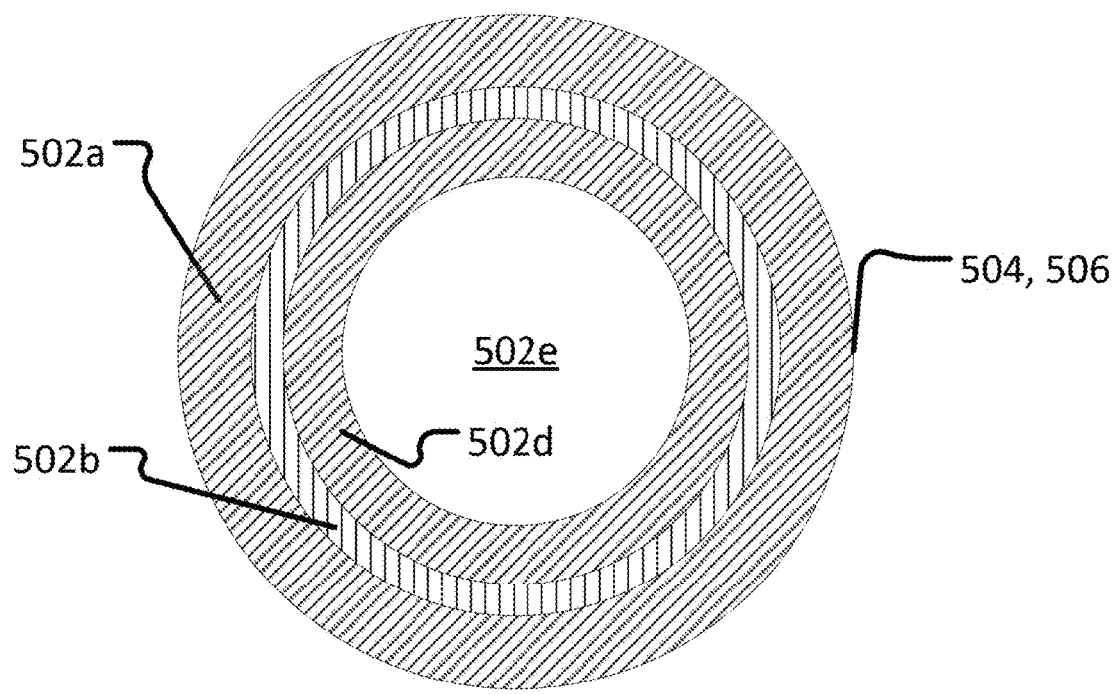

Isolation barrier 502f separates conductors 502b and 502c. Further isolation barriers may be included to create further conductive paths. In alternative embodiments, conductors 502b and 502c may be a single conductor, as shown in FIG. 22B, without isolation barriers like 502f. In such embodiments, cross section line A is arranged in both proximal and distal sections of vessel 502 for carrying an electrical signal through vessel 502. As shown in FIG. 22A, conductors 502b and 502c may be respectively for coupling with a positive and negative terminal of a power source or, may carry parallel or independent signals.

Vessel 502 defines cavity 502e, which typically accepts a mesh bag, cartridge, and/or botanical material for extraction. Additionally or alternatively a cross section may not include a cavity, particularly a distal section of a "top loading" extraction vessels, such as the one show in FIG. 3.

Figure 22C:
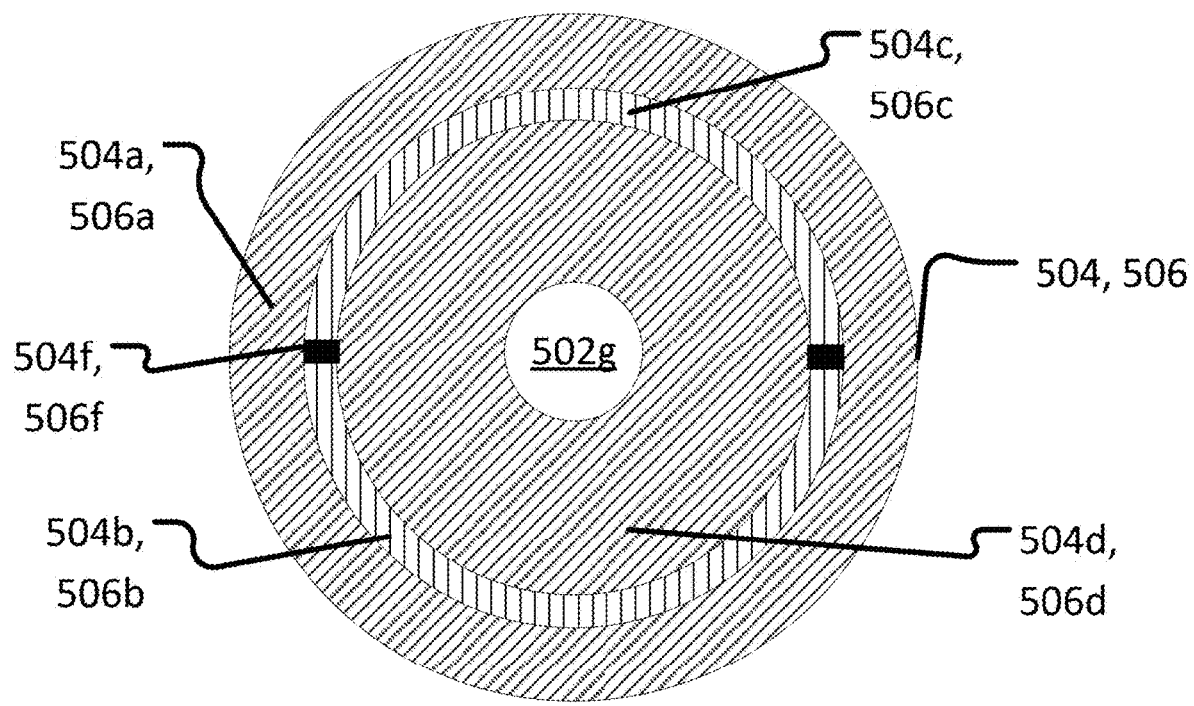
Figure 22D:
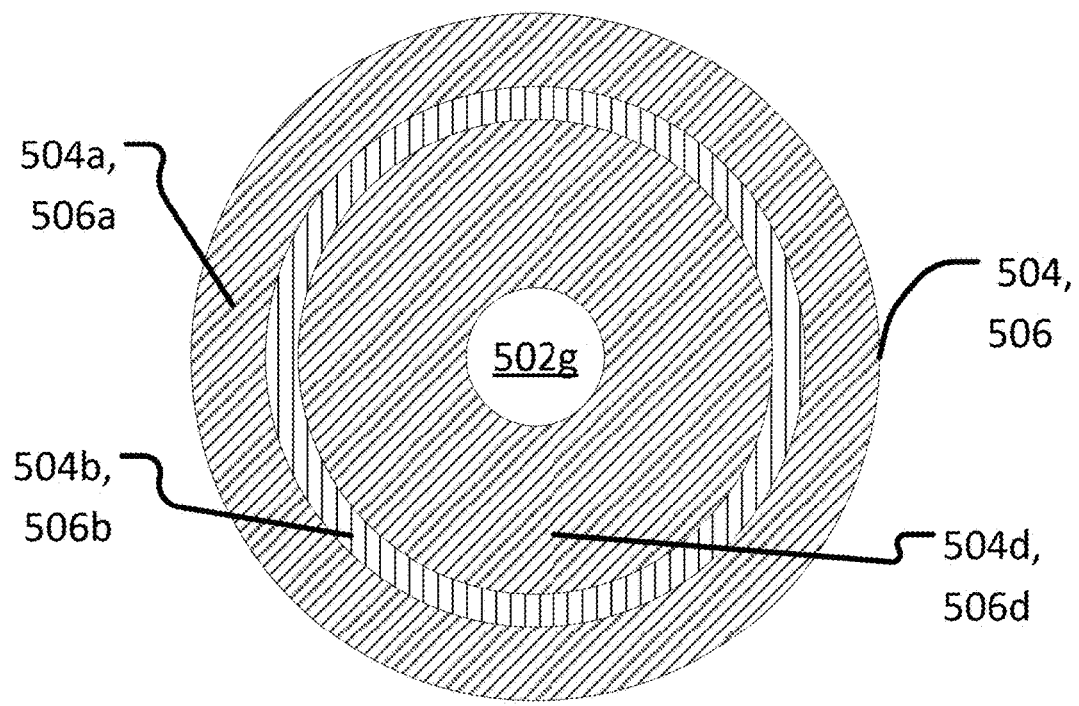

FIGS. 22C and 22D show the corresponding mechanical interface cross sections, taken along line B of FIG. 5, which may include either or both upper and lower mechanical interfaces 504 and 506 and respective sections and apertures, as detailed below, and isolation barriers 504f and 506f.

One or more of sections 504a, 506a; and 504c, 506c may include permanent magnets or electromagnets for facilitating a mechanical, electrical, and/or fluid coupling between an extraction system and an extraction vessel having or coupled to one or more portions of ferromagnetic material. Aperture 502g may allow for instruments such as probes and/or fluid communication, but alternative embodiments include cross sections with no apertures, such as in some lower mechanical interface examples and/or when fluid communication is established in an alternative way such as on a side wall of an extraction vessel. Alternative embodiments also include a plurality of apertures being of the same or different sizes and/or shapes.

Figure 23:
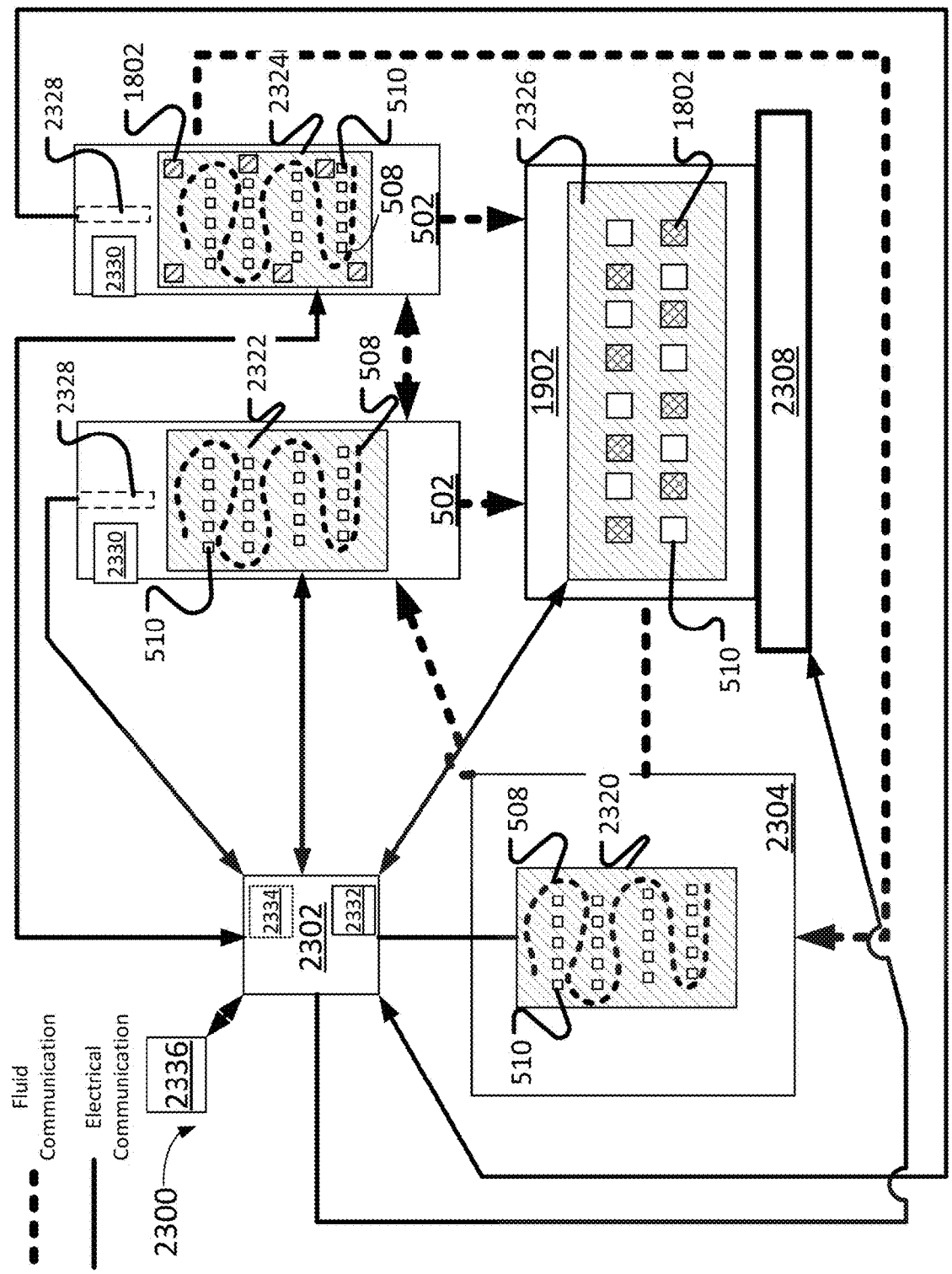
FIG. 23 is a schematic view of an example system for extracting solute from a source material.

Conductors may be resistance wire for heating the extraction vessel. Alternatively or additionally, conductors may carry power, control, and/or communication signals from a controller. As seen in FIG. 23, a computer readable memory may be associated with an extraction vessel such that a controller can read extraction parameters concerning the vessel such as botanical material type (e.g., a particular strain type, dry flower, wet flower, flash frozen flower, concentrate (e.g., hash, rosin, extract), source material types, non-botanical source material type, batch or other identification information, number of extractions, extraction "recipes" or parameters thereof such as extraction soak time, temperature, and/or solvent type.

FIG. 23 shows system 2300, which includes controller 2302 operably coupled to electric jackets 2320, 2322, 2324, and 2326 and heating element 2308, which may be a resistive or inductive-based heating element. Controller 2302 may heat and cool extraction system components of system 2300 exclusively via electronic cooling and heating (e.g., electric jackets). Controller 2302 may be further operably connected to one or more pressure sensors and/or temperature sensors of extraction system components such as probes 2328 and/or temperature sensors 1802 of one or more electric jackets. Based on one or more pressure and/or temperature sensor values, controller 2302 may adjust a current, voltage, or current direction applied to the electric jacket. Controller 2302 may switch from one element type to another (such as a heating element to a cooling element and vice versa) either to maintain a previous target temperature (e.g., an extraction temperature) or to conduct a further step in the extraction process.

Controller 2302 may further include switch 2334 (or a plurality of switches) for selectively applying power to an electric jacket from, for example, electric power source 2336. Switch 2334 may alternatively or additionally be arranged to switch the direction of current flow applied to an electric jacket with thermoelectric elements for heating or cooling an extraction system component.

Controller 2302 may be further operably connected to memory 2330. Memory 2330 electronically stores extraction-related data and programs for the controller to read and otherwise utilize. Parameters may be confirmatory in nature (e.g., a strain/botanical data type matching between the values stored in memory 2330 and memory 2332 of controller 2302) or instructive such as controller 2302 performing a particular extraction step, which have been described throughout this specification.

Controller 2302 may be either hardwired configured (e.g., configured EPROMs or FPGAs,) or include a program within memory 2303 to be executed by controller 2302 (e.g., a processor), that sets a timer for stopping all heating or cooling or a cooling or heating temperature limit. In the event that a sensor returns inaccurate data, the hard time stop (e.g., a maximum time period for an electric jacket to heat or cool an extraction system component) may prevent damaging an extraction system (and components thereof) as well as "ruining" an extraction batch.

A valuable aspect of this embodiment is that partial-to-complete automation of system 2300 can be coordinated via controller 2302 and the operably coupled jackets 2320, 2322, 2344, 2326, and/or heating element 2308. Controlled parameters may include solvent temperature, extraction temperature, extraction pressure, head pressure, a thermal gradient value, vessel pressure, intra-vessel pressure differential, extraction time, distillation temperature, condensation temperature, fluid/liquid level within a vessel, target values thereof, among other possible parameters such as a head-pressure temperature (e.g., a temperature applied to a vessel for establishing a head pressure), a head pressure target pressure, a solvent distillation temperature, a component activation temperature, a component distillation temperature, a differential temperature value between extraction system components, a differential pressure value between the extraction system components, a thermal gradient of an extraction system component, and a solvent condensing temperature.

Figure 24:
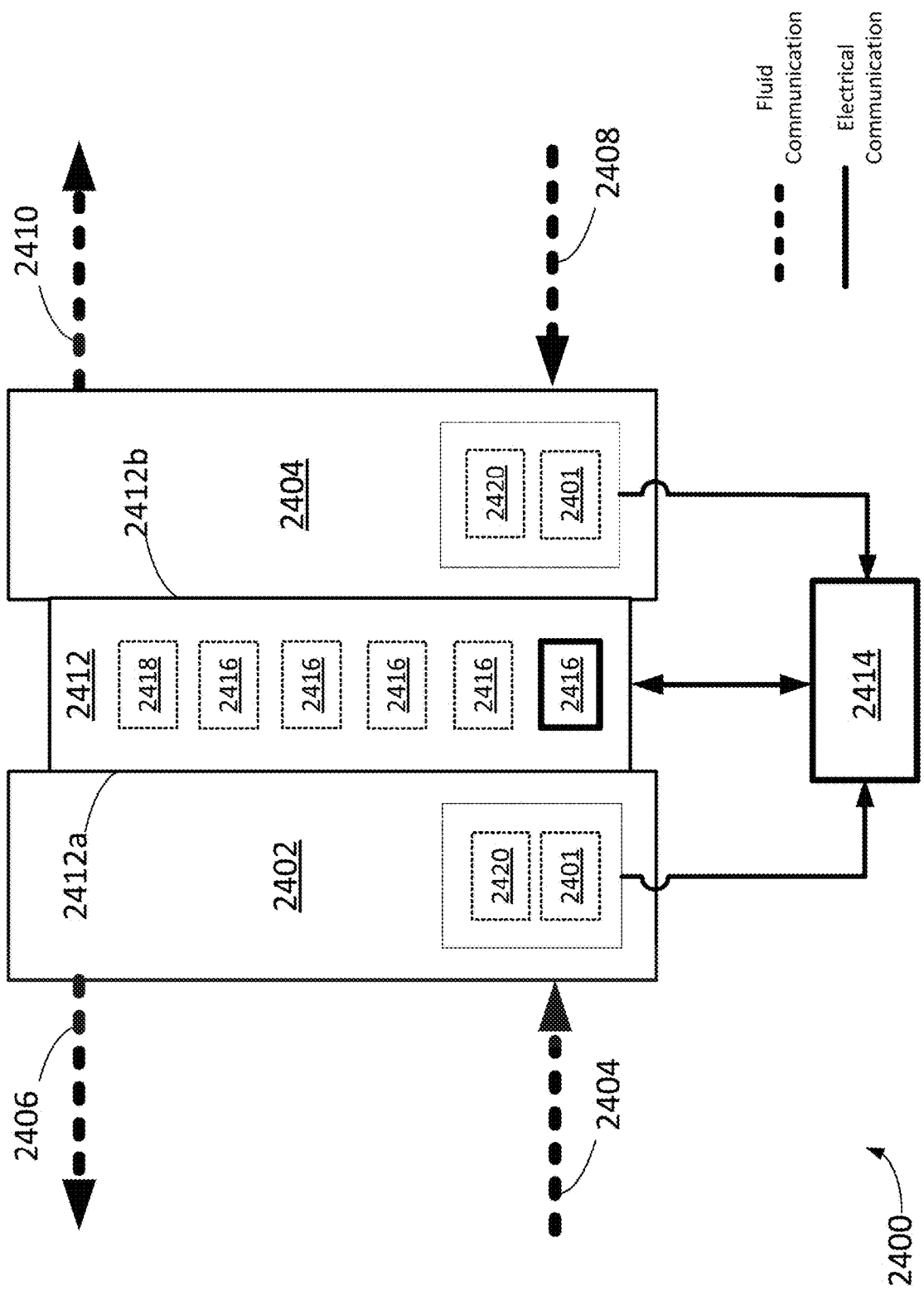
FIG. 24 is a schematic view of an example thermoelectric system.

FIG. 24 shows system 2400, which includes extraction system components 2402 and 2404, thermoelectric system 2412, controller 2414, fluid communication lines 2404, 2406, 2408, and 2410. In some embodiments, controller 2414 may be housed within system 2412. Additionally or alternatively, system 2412 may include controller 2418.

System 2412 includes one or more thermoelectric devices 2416, which may be independently controlled. For example, controller 2414 may select a sub-grouping of devices 2416 to efficiently heat or cool. In such embodiments, controller 2414 may engage the full plurality of devices 2416 to quickly reach a target temperature value of an extraction system component. In some embodiments, system 2412 includes one device 2416 such that all of the thermoelectric elements of system 2412 are engaged when heating or cooling. In some embodiments, controller 2414 may switch the current direction that is applied to system 2412 and thus switching the hot and cold sides. For example, thermally active side 2412a of system 2412 may be a hot side that is thermally coupled to component 2402 and an opposite thermally active side 2412b is a cold side that is thermally coupled to component 2404. A "thermally active side" is the side of a thermoelectric device or system that is arranged to cool or heat an object. In some embodiments, this may be a substrate that mechanically and/or thermally interfaces the semiconductor element with the object to be thermally regulated.

System 2400 may be utilized in environments that need both cooling and heating of a fluid, such as physical therapy pools, hot tubs, or aquariums. System 2400 has several possible applications in extraction. For example, extraction system components 2402 and 2404 may be reservoirs for fluids for jackets. In such embodiments, a warming fluid may be supplied by component 2402 and a cooling fluid by component 2404.

In some embodiments, components 2402 and 2404 thermally condition (e.g., heat, cool, condense, distil) solvent and/or mixtures thereof (e.g., a solvent-solute mixtures). In some embodiments, components 2402 and 2404 are respectively arranged upstream and downstream an extraction vessel. In said embodiment, system 2412 may thermally drive solvents and/or mixtures through a fluid pathway by inducing pressure differences between component 2402 and 2404 (e.g., between solvent vessels and/or other vessels).

Controller 2414 may be operably coupled with thermal sensors 2401 and/or pressure sensors 2420 for determining and controlling based on a temperature and/or pressure that is measured on or within component 2402 and/or 2404.

As an example, controller 2414 may establish target temperature and/or pressure differentials between components 2402 and 2404. Alternatively or additionally, said operation may involve little-to-no fluid in component 2402. For example, an extraction process may remove substantially all solvent from component 2402, which is eventually condensed in component 2404; thus component 2402 is effectively a heat sink, which can improve cooling performance of system 2412 when condensing and/or cooling solvent. Adding on to this idea, in some embodiments, solvent may still reside in component 2402, which may also serve as an additional heat sink when component 2404 is being cooled.

Figure 25:
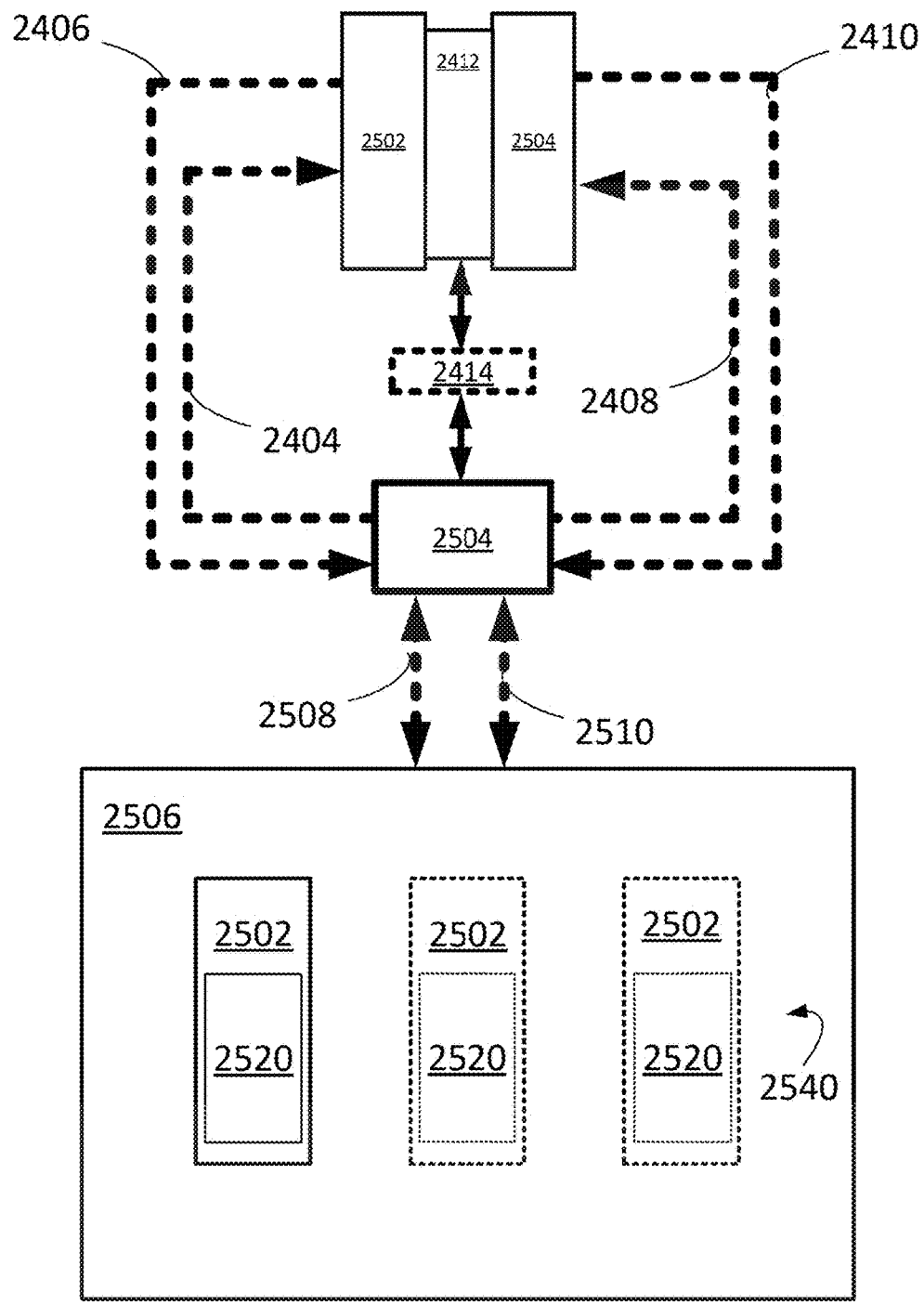
FIGS. 25-28 are schematic views of example systems for extracting solute from a source material.

FIG. 25 shows system 2500, which includes extraction vessel system 2540, vessels 2502 and 2504, thermoelectric system 2412, and fluid connector 2504 (e.g., one-, two-, three-, four-way valve(s) and/or manifolds). System 2500 may include intermediary and/or additional valves and/or pumps (e.g., a circulation pump), which are not shown to better highlight innovative aspects. Controller 2414 may be operably coupled to system 2412 and fluid connector 2504. Although an electrical connection is shown between controller 2414 and connector 2504, additionally or alternatively, controller 2414 may pneumatically control connector 2504 and thus may avoid sending electrical signals to connector 2504.

System 2540 may include one or more extraction vessels 2502 and liquid jackets 2520. Support structure 2506 may fluidly interface the warming and cooling fluids directed by connector 2504 to one or more fluid jackets 2520. Fluid jackets 2520 may be fluidly connected in series, such that a fluid flows from one jacket to the next, and/or in parallel, such that, for example, a first fluid jacket receives a cooling fluid and a second fluid jacket receives a warming fluid. Connector 2504 may have one or more fluid lines 2508 and 2510 for fluidly connecting connector 2504 with support structure 2506.

Fluid connector 2504 may be adapted and arranged to selectively direct the flow of the warming and cooling fluids that respectively circulate through vessels 2502 and 2504 to one or more fluid jackets 2520, which are thermally coupled to extraction vessels 2502.

Figure 26:
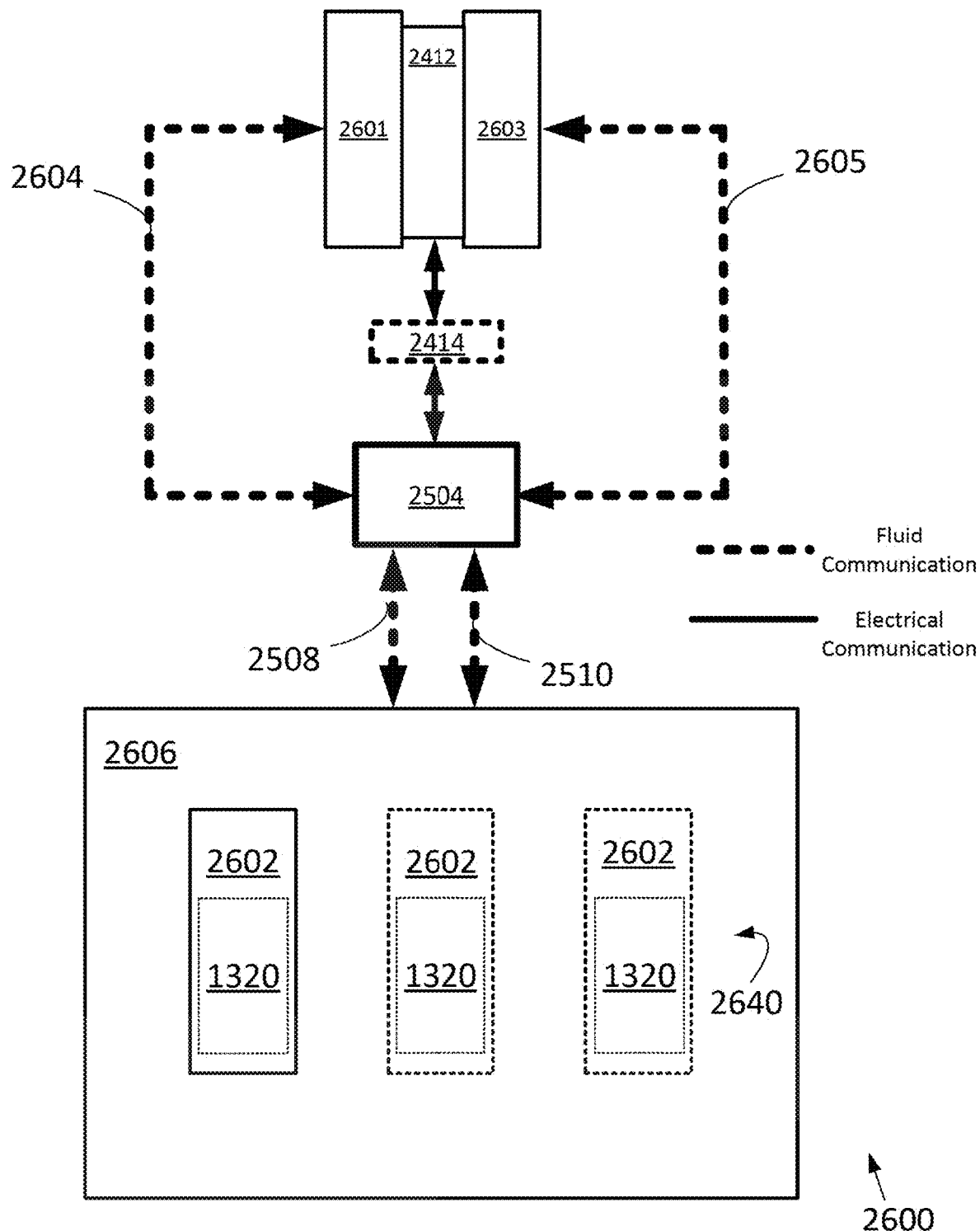

FIG. 26 shows system 2600, which includes support structure 2606; extraction vessel system 2640; extraction vessels 2602; solvent vessels 2601 and 2603; fluid lines 2508, 2510, 2604, and 2605; thermoelectric system 2412; controller 2414; and fluid connector 2504.

System 2600 may selectively direct solvent to one or more extraction vessels 2602. For example, connector 2504 may fluidly connect (i.e., put in fluid communication) solvent vessel 2601, extraction vessel 2602, and solvent vessel 2603, with extraction vessel 2602 arranged, with respect to the fluid path, between solvent vessel 2601 and solvent vessel 2603. In such embodiments, system 2412 may heat solvent vessel 2601 to establish a head pressure and/or a solvent temperature. At the same time, system 2412 will cool solvent vessel 2603, thereby establishing a pressure differential sufficient to transfer solvent from solvent vessel 2601 to extraction vessel 2602.

Alternatively or additionally, electric jacket 1320 can selectively heat and cool extraction vessel 2602. For example, after extraction therein and solvent-solute mixture evacuation therefrom, jacket 1320 may heat extraction vessel 2602 for evaporating residual solvent residing in the botanical or other material residing within the extraction vessel 2602. Additionally or alternatively, system 2412 may cool solvent vessel 2603 for thermally driving solvent vapor from extraction vessel 2602 to solvent vessel 2603 (i.e., establish a thermal gradient between extraction vessel 2602 to solvent vessel 2603).

Figure 27:
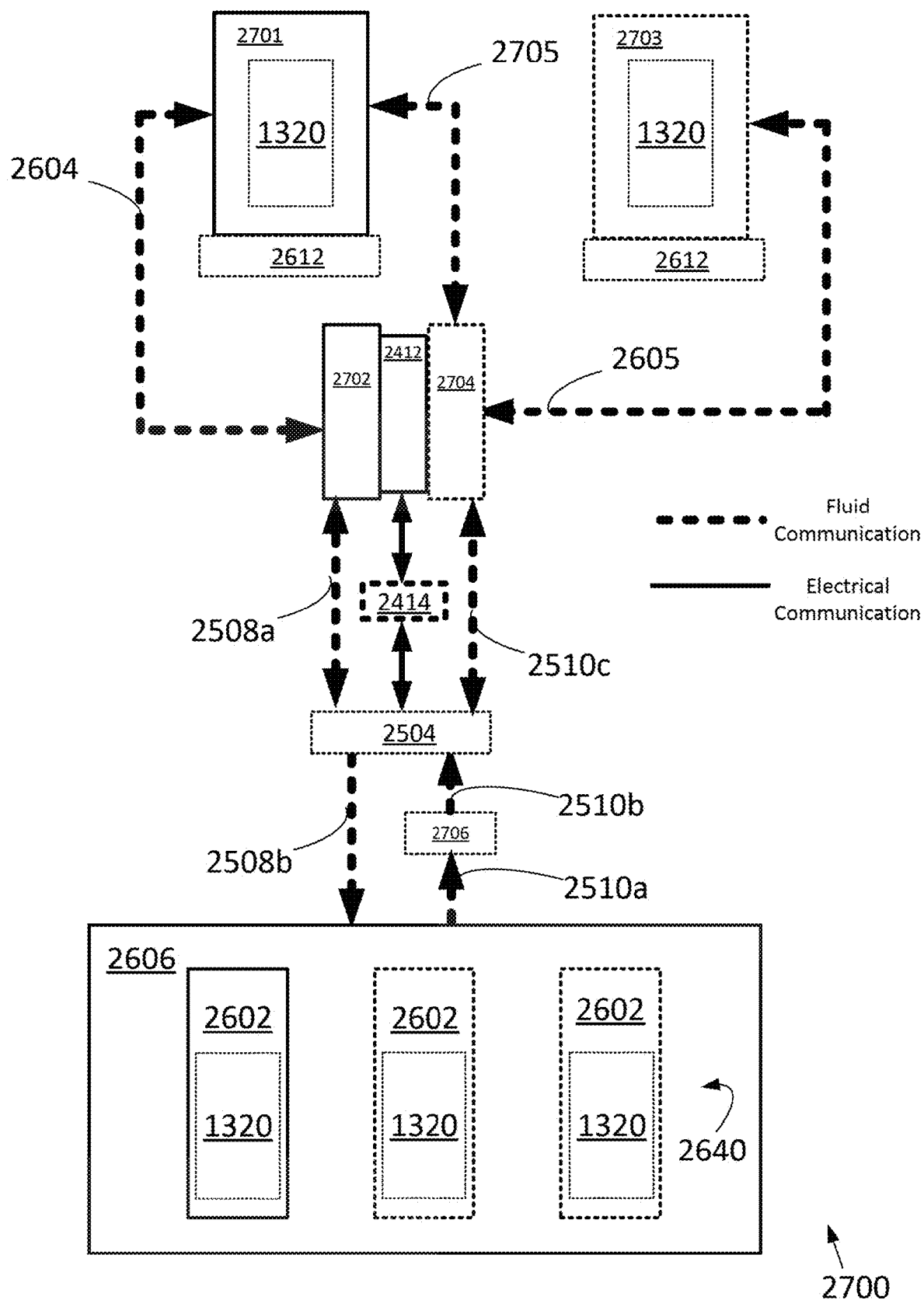

FIG. 27 shows system 2700, which includes support structure 2606; extraction vessel system 2640; extraction vessels 2602; solvent vessels 2701 and 2703; fluid lines 2508a-b, 2510a-c, 2604, 2605, 2705; thermoelectric system 2412; controller 2414; thermal conditioners 2702 and 2704; fluid connector 2504; and separator 2706.

Solvent may flow from solvent vessel 2701 to thermal conditioner 2702, which may heat or cool the received solvent for establishing and/or maintaining a solvent temperature for extraction. In some solvent embodiments, thermal conditioner 2702 may heat the solvent before the heated solvent is introduced to extraction vessel 2602. This may be particularly desirable for embodiments utilizing carbon dioxide as a solvent. Additionally or alternatively, thermal conditioner 2702 may cool a solvent for establishing and/or maintaining a solvent temperature for extraction. This may be particularly desirable for embodiments utilizing hydrocarbons (e.g., butane and/or propane) or ethanol as a solvent.

If heating via thermal conditioner 2702, thermal conditioner 2704 may be, at the same time, cooling and/or condensing post-extraction solvent that may be separated from extracted components via separator 2706. Separation may occur thermally, under vacuum, via tank distillation, roto-evaporation, cyclonic separation, thin-film evaporation, among other techniques. Solvent, in vapor form, may leave separator 2706 and be directed to thermal conditioner 2704, which may condense the post-extraction solvent before the condensed solvent is directed to solvent vessel 2701 or 2703.

In some embodiments, thermal conditioner 2704 may be a secondary or primary solvent-solute separator. For example, separator 2706 may evaporate at least 90% of the solvent from the mixture produced by extraction vessel 2602 or be omitted. In either case, thermal conditioner receives a mixture of solvent and solute. Controller 2414 may cause system 2412 to heat thermal conditioner 2704 to remove at least substantially all of the solvent from the mixture. This heating step may occur while solvent in thermal conditioner 2702 is being cooled.

Additionally or alternatively, thermal conditioner can independently heat and cool solvent, either pre- or post-extraction and separation (e.g., operate serially as opposed to the previously parallel solvent processing embodiments).

As discussed elsewhere, electric jackets 1320 may selectively heat and cool for driving solvent for extraction and driving solvent-solute mixtures for reclamation by establishing and/or increasing thermal gradients. Alternatively or additionally, thermoelectric system 2612 may be arranged below solvent tanks 2701 and 2703 for selectively heating and cooling said tanks.

In multiple extraction vessel 2602 embodiments, thermoelectric system 2412 may be used in parallel such that thermal conditioner 2702 is heating solvent for and upstream of a first extraction vessel 2602 while thermal conditioner 2704 is cooling and/or condensing solvent received from and downstream of a second extraction vessel 2602 and/or separator 2706.

Other examples of parallel use of system 2412 include cooling solvent for and upstream of a first extraction vessel 2602 while thermal conditioner 2704 is heating and/or evaporating solvent and mixtures thereof (e.g., a solvent blend and/or a solute-solvent mixture) received from a second extraction vessel 2602 and/or separator 2706. Said heating by thermal conditioner 2704 may be a primary or secondary heating of the vapor solvent. For example, solvent may be evaporated from a mixture in evaporator 2706 and the evaporated solvent is further heated by thermal conditioner 2704 to further remove possible non-solvent components along with possible desiccation of the vapor solvent. In some embodiments, thermal conditioner 2704 is a primary or secondary separator for separating solvent and/or individual components of a mixture. In such embodiments, thermal conditioner 2702 may cool solvent for and upstream of a first extraction vessel 2602 while thermal conditioner 2704 is evaporating solvent from a mixture received from a second extraction vessel 2602 or separator 2706.

Figure 28:
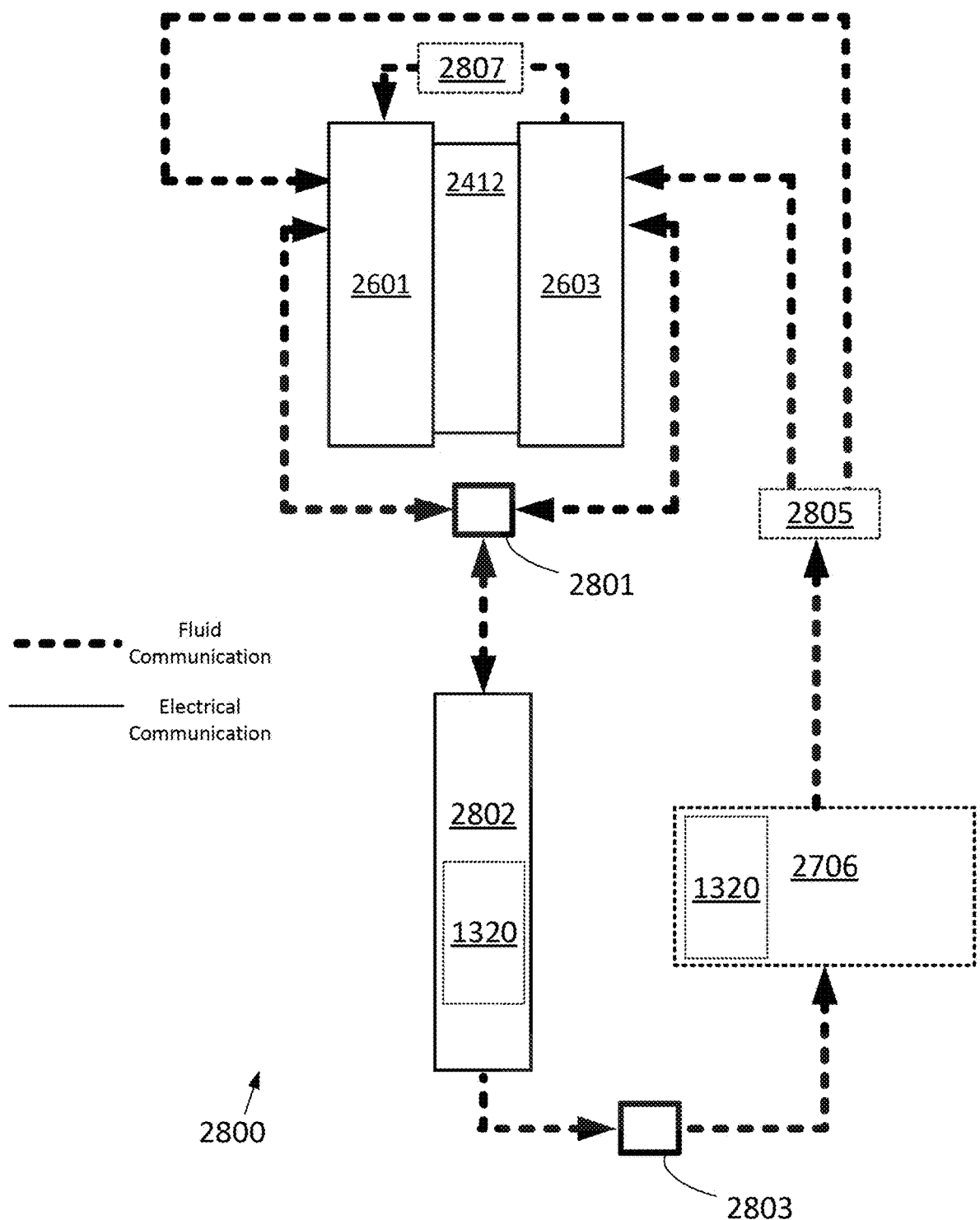

FIG. 28 shows system 2800 in which system 2412 may be utilized for thermally driving solvent and mixtures through system 2800, which includes vessels 2601 and 2603 for solvents and solvent-solute mixtures, fluid connectors 2801, 2803, 2805, and 2807, extraction vessel 2082 for receiving solvent and solute-bearing material for producing a solution or other mixture, separator 2706, and electric jacket 1320. Possible controllers, further valves, and pumps are omitted to highlight embodiment innovations.

As in previous embodiments, thermoelectric system 2412 may operate in parallel such that vessel 2601 is being heated to provide a head pressure and/or set an extraction temperature/pressure within vessel 2601 while the pressure of vessel 2603 is being reduced and/or solvent is being cooled and/or condensed. Said solvent may be received in vapor form from a heated extraction vessel 2802 and/or separator 2706. Solvent may be condensed and collected in vessel 2603 and then transfer, via connector 2807, to vessel 2601 or directed to extraction vessel 2802.

If transferring collected solvent from vessel 2603 to vessel 2601 via connector 2807, thermoelectric system 2412 may apply heat to vessel 2603 to establish a head pressure and cool vessel 2601 to reduce the pressure within vessel 2601.

This example embodiment shows that all thermal operations of an extraction system can be provided and controlled electronically. As a further example, vessel 2601 may be fluidly connected upstream of extraction vessel 2802 and vessel 2603 can be fluidly connected downstream of extraction vessel 2802. Thermoelectric system 2412 can heat vessel 2601 to provide a head pressure and/or set an extraction temperature within vessel 2601 while the pressure of vessel 2603 is being reduced the pressure within vessel 2603. By defining such a thermal gradient within system 2800, solvent will be driven, possibly without pumps, from vessel 2601 to extraction vessel 2802.

Cooling vessel 2603 may further drive solvent-solute mixtures (with or without gravity assistance, pump assistance, and/or thermal assistance by applying heat on an extraction system component such as vessels 2802 and/or 2706) from extraction vessel 2802 to separatory 2706 and/or vessel 2603 by having a relatively lower pressure with respect to extraction vessel 2802 and/or separatory 2706.

FIG. 29 shows cycling thermal gradients across extraction vessel 2902 by an electric jacket, which is not shown. At T1, the electric jacket applies a first thermal gradient across extraction vessel 2902. Later, at T2, the thermal gradient may be switched or inversed such that the hot and cold sides are swapped. At T3, the thermal gradient is reverted to the one shown for T1. This and other cycles may continue for a pre-determined time as part of an extraction process.

The disclosure above encompasses multiple distinct inventions with independent utility. While each of these inventions has been disclosed in a particular form, the specific embodiments disclosed and illustrated above are not to be considered in a limiting sense as numerous variations are possible. For example, sensors, resistive heater(s), and/or a plurality of thermoelectric elements may reside on a pad instead of a jacket. A pad is generally on a top or bottom planar surface of an extraction system component, but may also be wrapped around an extraction system component.

Another example is that solvent may be introduced at the top, side, or bottom sections of an extraction vessel (e.g., top loading, bottom loading, or side loading solvent). A schematically shown fluid connection line may comprise one or more fluid lines and associated valves and pumps. Solvents may include mixtures of two or more solvents such as hydrocarbon blends.

The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A system arranged or arrangeable for electrically controlling a temperature of one or more extraction system components, the system comprising:
a first plurality of thermoelectric devices for thermally coupling with an extraction system component at multiple locations along the extraction system component such that each thermoelectric device of the first plurality of thermoelectric devices respectively reside at a different corresponding location of the extraction system component when the first plurality of thermoelectric devices is coupled to the extraction system component; and
a controller operably coupled to the first plurality of thermoelectric devices, the controller configured or configurable to establish or maintain at least a first target temperature by selectively applying or causing the selective application of electrical power to the first plurality of thermoelectric devices.

2. The system of claim 1, with the controller configured or configurable to selectively reverse a current direction applied to the first plurality of thermoelectric devices to establish or maintain at least a second target temperature.

3. The system of claim 1, with the first plurality of thermoelectric devices each comprising a Peltier cooler.

4. The system of claim 1 further comprising at least one electric heating element.

5. The system of claim 4, with the at least one electric heating element being a plurality of resistive heating elements, a second plurality of thermoelectric devices, or a subplurality of the first plurality of thermoelectric devices.

6. The system of claim 5 with the plurality of resistive heating elements comprising at least one of a metal heating element, a ceramic heating element, a thick-film heater, and a polymer PTC heating element.

7. The system of claim 4 further comprising at least one switch operably coupled to the plurality of thermoelectric devices, the at least one electric heating element, and the controller.

8. The system of claim 4 further comprising an extraction vessel, the extraction vessel comprising the at least one electric heating element.

9. The system of claim 8 with the at least one electric heating element mounted onto a surface of the extraction vessel or embedded within a wall of the extraction vessel.

10. The system of claim 8 further comprising a mechanical interface for coupling an extraction vessel to the system, the mechanical interface adapted to electrically connect with the at least one electric heating element.

11. The system of claim 1 further comprising a jacket comprising the first plurality of thermoelectric devices, the jacket arranged or arrangeable for coupling with an external surface of the extraction system component, thereby coupling the first plurality of thermoelectric devices at multiple locations along the extraction system component.

12. The system of claim 11, with the jacket further comprising at least one electric heating element.

13. The system of claim 12, with the at least one electric heating element being a plurality of resistive heating elements, a second plurality of thermoelectric devices, or a subplurality of the first plurality of thermoelectric devices.

14. The system of claim 12, with the controller operably coupled to the at least one electric heating element, and the controller configured or configurable to establish or maintain at least a second target temperature by selectively applying or causing the selective application of electrical power to the at least one electric heating element.

15. The system of claim 11 with the jacket further comprising at least one temperature sensor.

16. The system of claim 1 further comprising a pad comprising the first plurality of thermoelectric devices, the pad arranged or arrangeable for coupling with an external surface of the extraction system component, thereby coupling the first plurality of thermoelectric devices at multiple locations along the extraction system component.

17. The system of claim 16, with the pad further comprising at least one electric heating element.

18. The system of claim 17, with the at least one electric heating element being a plurality of resistive heating elements, a second plurality of thermoelectric devices, or a subplurality of the first plurality of thermoelectric devices.

19. The system of claim 17, with the controller operably coupled to the at least one electric heating element, the controller configured or configurable to establish or maintain at least a second target temperature by selectively applying or causing the selective application of electrical power to the at least one electric heating element.

20. The system of claim 16, with the pad further comprising at least one temperature sensor.

21. The system of claim 1 further comprising at least one temperature sensor and with the controller arranged to receive a temperature sensor signal that characterizes a temperature of the extraction system component, the controller configured or configurable to establish or maintain at least the first target temperature based on at least the temperature sensor signal.

22. The system of claim 1 further comprising at least two temperature sensors and with the controller arranged to receive at least two temperature sensor signals that each characterize a temperature of the extraction system component, the controller configured or configurable to establish or maintain at least the first target temperature based on the at least two temperature sensor signals.

23. The system of claim 1 further comprising a first temperature sensor arranged within the extraction system component and a second temperature sensor arranged on or near an external surface of the extraction system component and with the controller arranged to receive at least a first and second temperature sensor signals, the controller configured or configurable to establish or maintain at least the first target temperature based on the at least first and second temperature sensor signals.

24. The system of claim 1 with the controller configured or configurable to establish or maintain at least one of an extraction temperature, a head-pressure temperature, a head-pressure target pressure, a solvent distillation temperature, a component activation temperature, a component distillation temperature, a differential temperature value between extraction system components, a differential pressure value between the extraction system components, a thermal gradient of an extraction system component, and a solvent condensing temperature.

25. The system of claim 1 with the first plurality of thermoelectric devices arranged or arrangeable for coupling mechanically and thermally with the extraction system component at multiple locations along the extraction system component.

26. The system of claim 1, with the first plurality of thermoelectric devices comprising a first plurality of thermoelectric coolers, the system further comprising at least one electric heating element, the controller operably coupled to the at least one electric heating element for selectively heating the extraction system component.

27. The system of claim 1 further comprising at least one switch operably coupled to the plurality of thermoelectric devices and the controller.

28. The system of claim 1 further comprising an inductive heater operably coupled to the controller.

29. The system of claim 1 with the extraction system component being a solvent tank, an extraction vessel, a collection tank, or a separation tank.

30. The system of claim 1 with the controller configured or configurable to maintain the at least first target temperature for a maximum allowable time and end or cause the end of applying electrical power to the first plurality of thermoelectric devices.

* * * * *